(12) United States Patent
Hall

(10) Patent No.: US 12,546,857 B2
(45) Date of Patent: Feb. 10, 2026

(54) RADAR

(71) Applicant: Cambridge Sensoriis Ltd, Cambridge (GB)

(72) Inventor: Michael Peter Hall, Cambridge (GB)

(73) Assignee: Cambridge Sensoriis Ltd, Cambridge (GB)

( * ) Notice: Subject to any disclaimer, the term of this patent is extended or adjusted under 35 U.S.C. 154(b) by 315 days.

(21) Appl. No.: 18/324,660

(22) Filed: May 26, 2023

(65) Prior Publication Data

US 2023/0384416 A1 Nov. 30, 2023

(30) Foreign Application Priority Data

May 27, 2022 (GB) ...................................... 2207826

(51) Int. Cl.
*G01S 7/35* (2006.01)
*G01S 7/40* (2006.01)

(52) U.S. Cl.
CPC ................ *G01S 7/352* (2013.01); *G01S 7/40* (2013.01)

(58) Field of Classification Search
CPC .................................. G01S 7/352; G01S 7/40
USPC .......................................................... 342/350
See application file for complete search history.

(56) References Cited

U.S. PATENT DOCUMENTS

| | | | | |
|---|---|---|---|---|
| 7,650,080 B2* | 1/2010 | Yap | ........................... | G02F 2/02 398/186 |
| 8,554,085 B1* | 10/2013 | Yap | ....................... | H03B 28/00 398/187 |
| 8,750,717 B1* | 6/2014 | Yap | ........................... | G02F 2/02 398/163 |
| 11,353,549 B2* | 6/2022 | Jansen | ................... | G01S 13/343 |
| 11,550,028 B2* | 1/2023 | Melzer | ...................... | G01S 7/35 |
| 2004/0264977 A1* | 12/2004 | Yap | ........................... | G02F 2/02 398/161 |
| 2013/0021196 A1* | 1/2013 | Himmelstoss | .......... | G01S 7/023 342/159 |
| 2014/0225762 A1* | 8/2014 | Seller | .................... | G01S 13/876 342/125 |
| 2015/0168539 A1* | 6/2015 | Himmelstoss | ........ | G01S 13/931 342/159 |
| 2016/0003940 A1* | 1/2016 | Seller | ....................... | G01S 7/40 342/132 |
| 2016/0025844 A1* | 1/2016 | Mckitterick | .......... | G01S 7/4004 342/21 |

(Continued)

FOREIGN PATENT DOCUMENTS

| CN | 113009424 | 6/2021 |
|---|---|---|
| CN | 113544537 | 10/2021 |

(Continued)

*Primary Examiner* — Nuzhat Pervin
(74) *Attorney, Agent, or Firm* — Jordan IP Law, LLC

(57) ABSTRACT

An FMCW radar system in which the patterns of chirp pairs for master and slave radar devices are selected such that when one of the chirps in a chirp pair (A, B) from the master coincides in time with one of the chirps in a chirp pair (C, D) from the slave, the other chirps in those pairs do not coincide in time. This allows for background subtraction and for the slave to self-synchronise to the master by detecting an in-band tone in the difference between spectral responses obtained by mixing signals from the master and the slave at the times of the slave's chirps, and driving that tone, once detected, to a particular set point.

20 Claims, 17 Drawing Sheets

(56) References Cited

U.S. PATENT DOCUMENTS

| | | | |
|---|---|---|---|
| 2016/0245913 A1* | 8/2016 | Park | G01S 13/95 |
| 2016/0291130 A1* | 10/2016 | Ginsburg | G01S 13/32 |
| 2016/0327633 A1* | 11/2016 | Kumar Y.B. | G01S 7/35 |
| 2017/0102457 A1* | 4/2017 | Li | G01S 7/10 |
| 2017/0276779 A1* | 9/2017 | Seller | G01S 13/84 |
| 2020/0003862 A1* | 1/2020 | Doaré | H03L 7/08 |
| 2020/0003883 A1* | 1/2020 | Doaré | H04L 27/0008 |
| 2020/0007309 A1* | 1/2020 | Vigier | G01S 13/878 |
| 2020/0007310 A1* | 1/2020 | Pavao Moreira | G01S 13/878 |
| 2020/0025870 A1* | 1/2020 | Melzer | G01S 7/032 |
| 2020/0150260 A1* | 5/2020 | Lang | G01S 13/42 |
| 2020/0292688 A1* | 9/2020 | Tseng | G01S 13/343 |
| 2021/0018588 A1* | 1/2021 | Akamine | G01S 7/411 |
| 2021/0149038 A1* | 5/2021 | Yuasa | G01S 7/354 |

FOREIGN PATENT DOCUMENTS

| | | | | |
|---|---|---|---|---|
| CN | 114072688 | | 2/2022 | |
| EP | 3056920 | | 8/2016 | |
| EP | 3923016 | | 12/2021 | |
| GB | 2226205 A | * | 6/1990 | G01S 7/356 |
| WO | 2021243491 | | 12/2021 | |

* cited by examiner

RADAR

CROSS-REFERENCE TO RELATED APPLICATIONS

This application claims priority to Great Britain Application number GB2207826.5 entitled "Radar" and filed on 27 May 2022, which is incorporated herein by reference.

TECHNICAL FIELD

This invention relates to synchronisation of multiple radar devices, including but not limited to synchronising a slave radar to a master radar, e.g. in a radar system that has multiple radar devices separated in space.

BACKGROUND ART

Radar systems are used in various fields, including for air traffic control (ATC) purposes. For decades, such radar systems have been used to locate and identify objects in a geographic region, and typically for the location and identification of aircraft in a particular airspace.

Such radar systems generally operate using electromagnetic radiation, particularly radio frequency (RF) signals. Radar systems typically include one or more radar devices that transmit a radio signal into the geographic region of interest, and then listen for reflections of that radio signal, where the reflections arise from the signal 'bouncing off' reflectors in the area including the target of interest (e.g. aircraft), as well as from background or 'spurious' reflections (e.g. from terrain, trees, meteorological phenomena, wildlife, etc.). From these received reflections, the distance and bearing to a particular target can be obtained.

Many radar systems employ multiple radar devices that are spread out from one another in a particular space, where these radar devices act together in order to track and observe a particular airspace. Where multiple such radars exist and are synchronised, such a system is typically referred to in the art as a 'multistatic radar' (or sometimes referred to as a 'multisite' or 'netted' radar). However, a system with several radar devices may be provided in which they are not necessarily always synchronised with one another.

In order for these various radar devices to co-operate when tracking and identifying targets in their shared area of coverage, it is important that the various radar devices are synchronised with one another. If the radar devices are not synchronised, accurate determination of the range, heading, and velocity of a given target may be extremely difficult if not impossible to ascertain.

Synchronisation may conventionally be achieved either by having a communication channel between the radar devices (e.g. a dedicated hard-wired connection) that can be used to co-ordinate timing, or by having a centralised timing control unit that dictates timing to all of the various radar devices. However, such solutions require additional hardware—e.g. additional communication hardware and/or bespoke RF hardware such as RF switch components. Such solutions may also place highly accurate requirements on the measurement and control circuitry.

While a global positioning satellite (GPS) clock could be used to provide a shared time base for the various devices, the Applicant has appreciated that GPS clocks cannot always be relied on to be available, and that blocking or interference can be common, particularly (but not exclusively) in conflict zones. Furthermore, use of GPS clocks necessitates additional hardware. Similarly, atomic clocks may be used but these may not be sufficiently accurate, and may add additional hardware complexity and cost.

The present invention seeks to provide an improved arrangement for synchronising radar devices within a radar system, for example a multistatic radar system. In particular, the present invention is concerned with frequency modulated continuous wave (FMCW) radar systems.

Synchronising radar devices has a number of desired benefits. These include, but are not limited to, that in a multistatic radar configuration, reflections from a 'master' radar can be received at a 'slave' radar and used to detect an otherwise hard-to-detect target. Secondly, irrespective of whether using a multistatic radar configuration, when the radar devices are synchronised, the master radar can detect the distance to a slave radar with high accuracy, so as to locate the slave radar (i.e. its range and bearing, and if secondaries operate in different bands then its ID too).

SUMMARY OF THE INVENTION

In accordance with a first aspect, embodiments of the present invention provide a frequency modulated continuous wave (FMCW) radar system comprising:
  a first FMCW radar device configured to transmit a plurality of first FMCW chirp frames each having a first pattern of time slots, said first pattern comprising: a first time slot containing a first FMCW chirp; a second time slot containing a second FMCW chirp; and a plurality of FMCW chirp-free time slots;
  a second FMCW radar device configured to transmit a plurality of second FMCW chirp frames each having a second pattern of time slots, said second pattern comprising: a first time slot containing a third FMCW chirp; a second time slot containing a fourth FMCW chirp; and a plurality of FMCW chirp-free time slots;
  wherein the first and second patterns are selected such that when one of the FMCW chirps in a first FMCW chirp frame coincides in time with one of the FMCW chirps in a second FMCW chirp frame, the other FMCW chirp in said first FMCW chirp frame does not coincide in time with the other FMCW chirp in said second FMCW chirp frame;
  said second FMCW radar device being further configured to:
  a) mix first signals from a received first FMCW chirp frame and a transmitted second FMCW chirp frame, said first signals corresponding to the time slot of the third FMCW chirp, thereby generating a first spectral response;
  b) mix second signals from the received first FMCW chirp frame and the transmitted second FMCW chirp frame, said second signals corresponding to the time slot of the fourth FMCW chirp, thereby generating a second spectral response;
  c) determine a difference between the first and second spectral responses and determine whether said difference contains a tone having a signal power greater than a predetermined threshold within an in-band frequency range;
  d) when the difference does not contain a tone having a signal power greater than the predetermined threshold within the in-band frequency range, the second FMCW radar device applies a predetermined interval step to the transmission timing of the next second FMCW chirp frame; and
  e) when the difference contains a tone having a signal power greater than the predetermined threshold within the in-band frequency range, the second FMCW radar device applies a variable dither to the transmission timing of the next second FMCW chirp frame, thereby driving a frequency of the tone toward a set point within the in-band frequency range.

The first aspect of the invention extends to an FMCW radar device configured to:

receive from an external radar device a plurality of first FMCW chirp frames each having a first pattern of time slots, said first pattern comprising: a first time slot containing a first FMCW chirp; a second time slot containing a second FMCW chirp; and a plurality of FMCW chirp-free time slots; and transmit a plurality of second FMCW chirp frames each having a second pattern of time slots, said second pattern comprising: a first time slot containing a third FMCW chirp; a second time slot containing a fourth FMCW chirp; and a plurality of FMCW chirp-free time slots;

wherein the second pattern is selected such that when one of the FMCW chirps in a first FMCW chirp frame coincides in time with one of the FMCW chirps in a second FMCW chirp frame, the other FMCW chirp in said first FMCW chirp frame does not coincide in time with the other FMCW chirp in said second FMCW chirp frame;

said FMCW radar device being further configured to:

a) mix first signals from a received first FMCW chirp frame and a transmitted second FMCW chirp frame, said first signals corresponding to the time slot of the third FMCW chirp, thereby generating a first spectral response;

b) mix second signals from the received first FMCW chirp frame and the transmitted second FMCW chirp frame, said second signals corresponding to the time slot of the fourth FMCW chirp, thereby generating a second spectral response;

c) determine a difference between the first and second spectral responses and determine whether said difference contains a tone having a signal power greater than a predetermined threshold within an in-band frequency range;

d) when the difference does not contain a tone having a signal power greater than the predetermined threshold within the in-band frequency range, apply a predetermined interval step to the transmission timing of the next second FMCW chirp frame; and e) when the difference contains a tone having a signal power greater than the predetermined threshold within the in-band frequency range, apply a variable dither to the transmission timing of the next second FMCW chirp frame, thereby driving a frequency of the tone toward a set point within the in-band frequency range.

The first aspect of the invention also extends to a method of operating an FMCW radar device, said method comprising:

receiving from an external radar device a plurality of first FMCW chirp frames each having a first pattern of time slots, said first pattern comprising: a first time slot containing a first FMCW chirp; a second time slot containing a second FMCW chirp; and a plurality of FMCW chirp-free time slots; and transmitting a plurality of second FMCW chirp frames each having a second pattern of time slots, said second pattern comprising: a first time slot containing a third FMCW chirp; a second time slot containing a fourth FMCW chirp; and a plurality of FMCW chirp-free time slots;

wherein the second pattern is selected such that when one of the FMCW chirps in a first FMCW chirp frame coincides in time with one of the FMCW chirps in a second FMCW chirp frame, the other FMCW chirp in said first FMCW chirp frame does not coincide in time with the other FMCW chirp in said second FMCW chirp frame;

said method further comprising:

a) mixing first signals from a received first FMCW chirp frame and a transmitted second FMCW chirp frame, said first signals corresponding to the time slot of the third FMCW chirp, thereby generating a first spectral response;

b) mixing second signals from the received first FMCW chirp frame and the transmitted second FMCW chirp frame, said second signals corresponding to the time slot of the fourth FMCW chirp, thereby generating a second spectral response;

c) determining a difference between the first and second spectral responses and determining whether said difference contains a tone having a signal power greater than a predetermined threshold within an in-band frequency range;

d) when the difference does not contain a tone having a signal power greater than the predetermined threshold within the in-band frequency range, applying a predetermined interval step to the transmission timing of the next second FMCW chirp frame; and e) when the difference contains a tone having a signal power greater than the predetermined threshold within the in-band frequency range, applying a variable dither to the transmission timing of the next second FMCW chirp frame, thereby driving a frequency of the tone toward a set point within the in-band frequency range.

The first aspect of the invention further extends to a non-transitory computer-readable medium comprising instructions that, when executed by a processor, cause the processor to carry out a method of operating an FMCW radar device, said method comprising:

receiving from an external radar device a plurality of first FMCW chirp frames each having a first pattern of time slots, said first pattern comprising: a first time slot containing a first FMCW chirp; a second time slot containing a second FMCW chirp; and a plurality of FMCW chirp-free time slots; and transmitting a plurality of second FMCW chirp frames each having a second pattern of time slots, said second pattern comprising: a first time slot containing a third FMCW chirp; a second time slot containing a fourth FMCW chirp; and a plurality of FMCW chirp-free time slots;

wherein the second pattern is selected such that when one of the FMCW chirps in a first FMCW chirp frame coincides in time with one of the FMCW chirps in a second FMCW chirp frame, the other FMCW chirp in said first FMCW chirp frame does not coincide in time with the other FMCW chirp in said second FMCW chirp frame;

said method further comprising:

a) mixing first signals from a received first FMCW chirp frame and a transmitted second FMCW chirp frame, said first signals corresponding to the time slot of the third FMCW chirp, thereby generating a first spectral response;

b) mixing second signals from the received first FMCW chirp frame and the transmitted second FMCW chirp frame, said second signals corresponding to the time slot of the fourth FMCW chirp, thereby generating a second spectral response;

c) determining a difference between the first and second spectral responses and determining whether said difference contains a tone having a signal power greater than a predetermined threshold within an in-band frequency range;

d) when the difference does not contain a tone having a signal power greater than the predetermined threshold within the in-band frequency range, applying a predetermined interval step to the transmission timing of the next second FMCW chirp frame; and e) when the difference contains a tone having a signal power greater than the predetermined threshold within the in-band frequency range, applying a variable dither to the transmission timing of the next second FMCW chirp frame, thereby driving a frequency of the tone toward a set point within the in-band frequency range.

The first aspect of the invention further extends to a computer software product comprising instructions that, when executed by a processor, cause the processor to carry out a method of operating an FMCW radar device, said method comprising:

receiving from an external radar device a plurality of first FMCW chirp frames each having a first pattern of time slots, said first pattern comprising: a first time slot containing a first FMCW chirp; a second time slot containing a second FMCW chirp; and a plurality of FMCW chirp-free time slots; and transmitting a plurality of second FMCW chirp frames each having a second pattern of time slots, said second pattern comprising: a first time slot containing a third FMCW chirp; a second time slot containing a fourth FMCW chirp; and a plurality of FMCW chirp-free time slots;

wherein the second pattern is selected such that when one of the FMCW chirps in a first FMCW chirp frame coincides in time with one of the FMCW chirps in a second FMCW chirp frame, the other FMCW chirp in said first FMCW chirp frame does not coincide in time with the other FMCW chirp in said second FMCW chirp frame;

said method further comprising:

a) mixing first signals from a received first FMCW chirp frame and a transmitted second FMCW chirp frame, said first signals corresponding to the time slot of the third FMCW chirp, thereby generating a first spectral response;

b) mixing second signals from the received first FMCW chirp frame and the transmitted second FMCW chirp frame, said second signals corresponding to the time slot of the fourth FMCW chirp, thereby generating a second spectral response;

c) determining a difference between the first and second spectral responses and determining whether said difference contains a tone having a signal power greater than a predetermined threshold within an in-band frequency range;

d) when the difference does not contain a tone having a signal power greater than the predetermined threshold within the in-band frequency range, applying a predetermined interval step to the transmission timing of the next second FMCW chirp frame; and e) when the difference contains a tone having a signal power greater than the predetermined threshold within the in-band frequency range, applying a variable dither to the transmission timing of the next second FMCW chirp frame, thereby driving a frequency of the tone toward a set point within the in-band frequency range.

The first aspect of the invention also extends to a method of operating a frequency modulated continuous wave (FMCW) radar system comprising first and second FMCW radar devices, said method comprising:

transmitting via the first radar device a plurality of first FMCW chirp frames each having a first pattern of time slots, said first pattern comprising: a first time slot containing a first FMCW chirp; a second time slot containing a second FMCW chirp; and a plurality of FMCW chirp-free time slots;

receiving said plurality of first FMCW chirp frames at the second radar device;

transmitting via the second radar device a plurality of second FMCW chirp frames each having a second pattern of time slots, said second pattern comprising: a first time slot containing a third FMCW chirp; a second time slot containing a fourth FMCW chirp; and a plurality of FMCW chirp-free time slots;

selecting the second pattern such that when one of the FMCW chirps in a first FMCW chirp frame coincides in time with one of the FMCW chirps in a second FMCW chirp frame, the other FMCW chirp in said first FMCW chirp frame does not coincide in time with the other FMCW chirp in said second FMCW chirp frame;

said method further comprising:

a) mixing first signals from a received first FMCW chirp frame and a transmitted second FMCW chirp frame, said first signals corresponding to the time slot of the third FMCW chirp, thereby generating a first spectral response;

b) mixing second signals from the received first FMCW chirp frame and the transmitted second FMCW chirp frame, said second signals corresponding to the time slot of the fourth FMCW chirp, thereby generating a second spectral response;

c) determining a difference between the first and second spectral responses and determining whether said difference contains a tone having a signal power greater than a predetermined threshold within an in-band frequency range;

d) when the difference does not contain a tone having a signal power greater than the predetermined threshold within the in-band frequency range, applying a predetermined interval step to the transmission timing of the next second FMCW chirp frame; and e) when the difference contains a tone having a signal power greater than the predetermined threshold within the in-band frequency range, applying a variable dither to the transmission timing of the next second FMCW chirp frame, thereby driving a frequency of the tone toward a set point within the in-band frequency range.

The first aspect of the invention further extends to a non-transitory computer-readable medium comprising instructions that, when executed by a processor, cause the processor to carry out a method of operating a frequency modulated continuous wave (FMCW) radar system comprising first and second FMCW radar devices, said method comprising:

transmitting via the first radar device a plurality of first FMCW chirp frames each having a first pattern of time slots, said first pattern comprising: a first time slot containing a first FMCW chirp; a second time slot containing a second FMCW chirp; and a plurality of FMCW chirp-free time slots;

receiving said plurality of first FMCW chirp frames at the second radar device;

transmitting via the second radar device a plurality of second FMCW chirp frames each having a second pattern of time slots, said second pattern comprising: a first time slot containing a third FMCW chirp; a second time slot containing a fourth FMCW chirp; and a plurality of FMCW chirp-free time slots;

selecting the second pattern such that when one of the FMCW chirps in a first FMCW chirp frame coincides in time with one of the FMCW chirps in a second FMCW chirp frame, the other FMCW chirp in said first FMCW chirp frame does not coincide in time with the other FMCW chirp in said second FMCW chirp frame;

said method further comprising:
a) mixing first signals from a received first FMCW chirp frame and a transmitted second FMCW chirp frame, said first signals corresponding to the time slot of the third FMCW chirp, thereby generating a first spectral response;
b) mixing second signals from the received first FMCW chirp frame and the transmitted second FMCW chirp frame, said second signals corresponding to the time slot of the fourth FMCW chirp, thereby generating a second spectral response;
c) determining a difference between the first and second spectral responses and determining whether said difference contains a tone having a signal power greater than a predetermined threshold within an in-band frequency range;
d) when the difference does not contain a tone having a signal power greater than the predetermined threshold within the in-band frequency range, applying a predetermined interval step to the transmission timing of the next second FMCW chirp frame; and
e) when the difference contains a tone having a signal power greater than the predetermined threshold within the in-band frequency range, applying a variable dither to the transmission timing of the next second FMCW chirp frame, thereby driving a frequency of the tone toward a set point within the in-band frequency range.

The first aspect of the invention further extends to a computer software product comprising instructions that, when executed by a processor, cause the processor to carry out a method of operating a frequency modulated continuous wave (FMCW) radar system comprising first and second FMCW radar devices, said method comprising:

transmitting via the first radar device a plurality of first FMCW chirp frames each having a first pattern of time slots, said first pattern comprising: a first time slot containing a first FMCW chirp; a second time slot containing a second FMCW chirp; and a plurality of FMCW chirp-free time slots;

receiving said plurality of first FMCW chirp frames at the second radar device;

transmitting via the second radar device a plurality of second FMCW chirp frames each having a second pattern of time slots, said second pattern comprising: a first time slot containing a third FMCW chirp; a second time slot containing a fourth FMCW chirp; and a plurality of FMCW chirp-free time slots;

selecting the second pattern such that when one of the FMCW chirps in a first FMCW chirp frame coincides in time with one of the FMCW chirps in a second FMCW chirp frame, the other FMCW chirp in said first FMCW chirp frame does not coincide in time with the other FMCW chirp in said second FMCW chirp frame;

said method further comprising:
a) mixing first signals from a received first FMCW chirp frame and a transmitted second FMCW chirp frame, said first signals corresponding to the time slot of the third FMCW chirp, thereby generating a first spectral response;
b) mixing second signals from the received first FMCW chirp frame and the transmitted second FMCW chirp frame, said second signals corresponding to the time slot of the fourth FMCW chirp, thereby generating a second spectral response;
c) determining a difference between the first and second spectral responses and determining whether said difference contains a tone having a signal power greater than a predetermined threshold within an in-band frequency range;
d) when the difference does not contain a tone having a signal power greater than the predetermined threshold within the in-band frequency range, applying a predetermined interval step to the transmission timing of the next second FMCW chirp frame; and
e) when the difference contains a tone having a signal power greater than the predetermined threshold within the in-band frequency range, applying a variable dither to the transmission timing of the next second FMCW chirp frame, thereby driving a frequency of the tone toward a set point within the in-band frequency range.

Thus it will be appreciated that embodiments of the present invention provide an improved scheme for FMCW radar synchronisation which can allow a second 'slave' radar to align its frequency modulation start times to that of the first 'master' radar. Advantageously, no access to any external synchronisation time signal (e.g. a GPS time clock) is required for synchronisation to be achieved, i.e. there does not need to be any independent connection (such as a cable) for signalling between the first and second radar devices to co-ordinate timing.

The FMCW radar system may, in some embodiments, comprise a multistatic radar system.

Those skilled in the art will appreciate that, as a result of the mixing steps, the first and second spectral responses (and thus the difference between them) will generally be within an intermediate frequency (IF) band. Thus the tone (if present) within the difference between the spectral responses can be said to be 'in-band', i.e. within that IF band. The tone being in-band is indicative of synchronisation. An initial 'search phase' is carried out in which the slave radar device looks for an in-band tone.

The existence of a peak in the difference in spectral responses (as determined by checking for a tone greater than the predetermined threshold) indicates that there is a tone 'in-band' of the radar, i.e. within the intermediate frequency band in which the spectral responses reside. This, in turn, indicates that the second radar device is synchronised to the first radar device. The predetermined threshold used for this peak detection step may be set as appropriate, and those skilled in the art will appreciate that the selection of the threshold value may be dependent on a number of factors including transmission power, reception sensitivity, the local environment around the radar system, etc. The predetermined threshold may be a variable or user-variable parameter.

As outlined above, the signals mixed by the second radar device are the first FMCW chirp frame signal received from the first radar device and the transmitted second FMCW chirp frame signal. Typically, the signal from the transmitted second FMCW chirp frame signal supplied to the mixer may be a local oscillator signal that is a copy of (or is derived from) the transmitted signal, rather than the transmitted second FMCW chirp frame itself.

Thus during the search phase, if there is no in-band tone, a time step is applied to the transmission timing, and thus to the signal provided to the mixer (which may generally be a local oscillator signal that is a copy of, or is derived from, the signal transmitted by the slave radar, as above), to search the next interval for an in-band tone, i.e. step d) outlined above. The predetermined interval step may be a time window corresponding to the in-band frequency range, i.e. the IF band.

Conversely, if there is an in-band tone, a dither (i.e. a relatively small time offset, less than the predetermined interval) is applied to the transmission timing to drive the tone toward a desired set point, i.e. step e) outlined above. The dither applied is typically dependent on an error between the currency frequency of the tone and the set point. This is referred to as the 'locking phase', and this process is also specifically referred to as 'coarse locking', particularly when the optional 'fine locking' process described below is also used.

The approach provided by the present invention may also provide significant benefits in terms of bandwidth efficiency. Embodiments of the present invention also advantageously do not require that the radar signals the second radar device to be shifted out of the usual and ongoing radar measurements band.

A further advantage of the present invention is that it can be implemented digitally (e.g. in software) without the need for additional complex RF signal conditioning, switching, or mixing beyond that found in numerous off-the-shelf radar modules, known in the art per se.

The approach to synchronising the first and second radars may also, as outlined in further detail below, allow the use of multiple unconnected radar modules to operate in concert, chirping (i.e. frequency modulating) simultaneously, increasing power on target, providing additional view receiver antenna locations, and increasing the operational range beyond that of a single isolated radar.

A yet further advantage of the present invention is that can support direct range measurements to be made from the first 'master' radar device to one or more second 'slave' radar devices with very high accuracy.

Additionally, as a result of the present invention, the radar devices are robustly distinguishable to one another, i.e. they can be detected distinctly from any spurious background reflections.

Each of the radar devices may be a primary radar or a secondary radar, as appropriate. Those skilled in the art will appreciate that the term "primary radar" has a particular meaning within this technical field, namely it is a conventional radar device that transmits electromagnetic waves and receives reflections of those waves that are reflected by targets in the surrounding space. Such a device is also sometimes referred to in the art as a "primary surveillance radar" (PSR), and these terms are used interchangeably herein. The second radar device may, additionally or alternatively, be a secondary radar.

Similarly, those skilled in the art will appreciate that the term "secondary radar" has a particular meaning within this technical field, namely it is a radar device that transmits electromagnetic waves carrying an interrogation signal and typically receives responses carrying information from a transponder. Such a device is also sometimes referred to in the art as a "secondary surveillance radar" (SSR), and these terms are used interchangeably herein.

Thus the first 'master' radar and the second 'slave' radar may each independently be primary radar device(s) and/or secondary radar device(s), as appropriate. Each of the radar devices may be any other suitable type of radar device, known in the art per se.

The FMCW radar system may be seen to be configured in a master-slave configuration, wherein the first radar device is a master device and the second radar device is a slave device. In a set of embodiments, there may be a one-to-many master-slave relationship, in which there are multiple second radar devices that are slaves while the first radar device is a master to which the slaves synchronise.

Where multiple second (i.e. 'slave') radar devices are used, these may each use the same chirp pattern as one another. In a particular set of such embodiments, the second pattern comprises alternating between FMCW chirps and chirp-free time slots. In other words, such a pattern has an FMCW chirp followed by a chirp-free time slot, followed by another FMCW chirp, followed by another chirp-free time slot (and so on). Such an arrangement provides for a 50% duty cycle of chirps and chirp-free time slots. This particular chirp pattern is advantageous for avoiding having the multiple second radar devices inadvertently synchronise to one another, rather than to the first radar device.

As outlined above, the second radar device seeks to detect an in-band tone, which indicates that the first and second radar devices are synchronised, and then drives that tone to a particular set point. It will be appreciated that by mixing the signals associated with the first FMCW chirp frame (the incoming radar signal) and the second FMCW chirp frame (the local oscillator signal), a spectral response in the intermediate frequency (IF) band is obtained, which is the frequency difference between the two signals. By determining the difference between the spectral responses, components in the IF band attributable to unwanted background reflections are removed. Due to the selection of the chirp patterns, at most one of the spectral responses will contain a tone at a frequency proportional to the timing offset between the transmission times of the chirps in question, and the other spectral response will not contain that tone. Again, due to the difference process, this tone remains (assuming it exists).

The second radar device may, in some embodiments, comprise a controller configured to carry out steps a) to d) using a feedback loop to monitor for the tone and to adjust the transmission timing in response, either to apply a step (during the search, to seek the tone in the first place) or dither (to adjust the tone's frequency to the set point once the tone is found). The controller may be configured to drive the tone to a particular frequency value or range, i.e. the set point. This type of control may be referred to as closed feedback control. The controller acts to drive (i.e. 'move') the position of the tone into the predetermined frequency band by adjusting the variable dither, e.g. using an iterative process.

While there are a number of different types of controllers and control schemes known in the art per se, in a particular set of such embodiments the controller comprises a proportional-integral-derivative (PID) controller. In such embodiments, the PID controller acts to drive the tone to the set point, e.g. to a particular frequency value or range (where the range may be characterised by a particular set point such as the mid-point or an end-point of that range). In other words, the PID controller may be configured to carry out step e) outlined above. The difference between the current frequency value of the tone and the set point is used as the 'error' input to the PID controller, while the value of the variable dither is controlled by the PID controller. PID controllers may be particularly advantageous for carrying out certain embodiments of the present invention because they can provide responsive and accurate control over the synchronisation of otherwise unconnected radar devices in a dynamic operating environment.

Steps a) to e) enable synchronisation of the second radar device to the first radar device. As well as providing for searching for the tone, the steps outlined previous provide for 'locking on to' a particular set point. The process of step e) may, in a particular set of embodiments, be seen as a first or 'coarse' tuning stage of the synchronisation, in which a 'coarse lock' on to the timing of the first radar device is acquired by the second radar device, but which is followed by a further 'fine lock' stage. In some embodiments, the second radar device is further configured to:

f) when the difference contains a tone having a signal power greater than the predetermined threshold within the in-band frequency range, the second FMCW radar device adjusts a start frequency of (or effective start time of) the second chirps transmitted by the second radar device to reduce a frequency difference between a chirp in a next first FMCW chirp frame and a chirp in a next second FMCW chirp frame. It will be appreciated that adjusting the start frequency of the second chirps may be seen as equivalent to adjusting the effective start time of the second chirps.

This additional step provides a 'fine lock' which may be carried out after the coarse lock process to further enhance the synchronisation between the radar devices.

The 'fine lock' feature of step f) may be carried out by any suitable hardware similar to steps a) to e) as outlined previously, and may be carried out by a controller such as a PID controller. This hardware, controller, or PID controller may be the same as that used to carry out steps a) to e).

As outlined previously, the second radar device receives multiple chirp frames from the first radar device, e.g. in a temporal sequence. These chirp frames may be transmitted by the first radar device intermittently, however in some embodiments the first FMCW chirp frames are transmitted periodically by the first radar device.

If the tone in the difference between the spectral responses is lost, i.e. such that the tone is no longer detected, the slave radar device may return to the search phase, i.e. to carrying out the process of step d).

The various functional features of the devices may be carried out within hardware components dedicated to that specific function, or there may be one or more hardware component(s) that carry out more than one of these functions. For example, the functions of a radar device in accordance with embodiments of the present invention may be carried out within one or more of: discrete hardware; electronic circuitry; a processor; an integrated circuit (IC); a field-programmable gate array (FPGA); an application-specific integrated circuit (ASIC); a programmable logic device (PLD); and/or other similar hardware known in the art per se.

When viewed from a second aspect, embodiments of the present invention provide a frequency modulated continuous wave (FMCW) radar system comprising:
- a first FMCW radar device configured to transmit a plurality of first FMCW chirp frames each having a first pattern of time slots, said first pattern comprising: a first time slot containing a first FMCW chirp; a second time slot containing a second FMCW chirp; and a plurality of FMCW chirp-free time slots;
- a second FMCW radar device configured to transmit a plurality of second FMCW chirp frames each having a second pattern of time slots, said second pattern comprising: a first time slot containing a third FMCW chirp; a second time slot containing a fourth FMCW chirp; and a plurality of FMCW chirp-free time slots;

wherein the first and second patterns are selected such that when one of the FMCW chirps in a first FMCW chirp frame coincides in time with one of the FMCW chirps in a second FMCW chirp frame, the other FMCW chirp in said first FMCW chirp frame does not coincide in time with the other FMCW chirp in said second FMCW chirp frame;

said second FMCW radar device being further configured to:
a) mix first signals from a received first FMCW chirp frame and a transmitted second FMCW chirp frame, said first signals corresponding to the time slot of the third FMCW chirp, thereby generating a first spectral response across an intermediate frequency band;
b) mix second signals from the received first FMCW chirp frame and the transmitted second FMCW chirp frame, said second signals corresponding to the time slot of the fourth FMCW chirp, thereby generating a second spectral response across the intermediate frequency band;
c) determine a difference between the first and second spectral responses and determine whether said difference contains a tone in said intermediate frequency band;
d) when the difference does not contain a tone in said intermediate frequency band, the second FMCW radar device applies a predetermined interval step to the transmission timing of the next second FMCW chirp frame; and
e) when the difference contains a tone in said intermediate frequency band, the second FMCW radar device applies a variable dither to the transmission timing of the next second FMCW chirp frame, thereby driving a frequency of the tone toward a set point within the in-band frequency range.

The second aspect of the invention extends to an FMCW radar device configured to:
receive from an external radar device a plurality of first FMCW chirp frames each having a first pattern of time slots, said first pattern comprising: a first time slot containing a first FMCW chirp; a second time slot containing a second FMCW chirp; and a plurality of FMCW chirp-free time slots; and
transmit a plurality of second FMCW chirp frames each having a second pattern of time slots, said second pattern comprising: a first time slot containing a third FMCW chirp; a second time slot containing a fourth FMCW chirp; and a plurality of FMCW chirp-free time slots;

wherein the second pattern is selected such that when one of the FMCW chirps in a first FMCW chirp frame coincides in time with one of the FMCW chirps in a second FMCW chirp frame, the other FMCW chirp in said first FMCW chirp frame does not coincide in time with the other FMCW chirp in said second FMCW chirp frame;

said FMCW radar device being further configured to:
a) mix first signals from a received first FMCW chirp frame and a transmitted second FMCW chirp frame, said first signals corresponding to the time slot of the third FMCW chirp, thereby generating a first spectral response across an intermediate frequency band;
b) mix second signals from the received first FMCW chirp frame and the transmitted second FMCW chirp frame, said second signals corresponding to the time slot of the fourth FMCW chirp, thereby generating a second spectral response across the intermediate frequency band;
c) determine a difference between the first and second spectral responses and determine whether said difference contains a tone in said intermediate frequency band;
d) when the difference does not contain a tone in said intermediate frequency band, apply a predetermined interval step to the transmission timing of the next second FMCW chirp frame; and
e) when the difference contains a tone in said intermediate frequency band, apply a variable dither to the transmission timing of the next second FMCW chirp frame, thereby driving a frequency of the tone toward a set point within the in-band frequency range.

The second aspect of the invention also extends to a method of operating an FMCW radar device, said method comprising:
receiving from an external radar device a plurality of first FMCW chirp frames each having a first pattern of time slots, said first pattern comprising: a first time slot containing a first FMCW chirp; a second time slot containing a second FMCW chirp; and a plurality of FMCW chirp-free time slots; and
transmitting a plurality of second FMCW chirp frames each having a second pattern of time slots, said second pattern comprising: a first time slot containing a third FMCW chirp; a second time slot containing a fourth FMCW chirp; and a plurality of FMCW chirp-free time slots;
wherein the second pattern is selected such that when one of the FMCW chirps in a first FMCW chirp frame coincides in time with one of the FMCW chirps in a second FMCW chirp frame, the other FMCW chirp in said first FMCW chirp frame does not coincide in time with the other FMCW chirp in said second FMCW chirp frame;
said method further comprising:
a) mixing first signals from a received first FMCW chirp frame and a transmitted second FMCW chirp frame, said first signals corresponding to the time slot of the third FMCW chirp, thereby generating a first spectral response across an intermediate frequency band;
b) mixing second signals from the received first FMCW chirp frame and the transmitted second FMCW chirp frame, said second signals corresponding to the time slot of the fourth FMCW chirp, thereby generating a second spectral response across the intermediate frequency band;
c) determining a difference between the first and second spectral responses and determining whether said difference contains a tone in said intermediate frequency band;
d) when the difference does not contain a tone in said intermediate frequency band, applying a predetermined interval step to the transmission timing of the next second FMCW chirp frame; and
e) when the difference contains a tone in said intermediate frequency band, applying a variable dither to the transmission timing of the next second FMCW chirp frame, thereby driving a frequency of the tone toward a set point within the in-band frequency range.

The second aspect of the invention further extends to a non-transitory computer-readable medium comprising instructions that, when executed by a processor, cause the processor to carry out a method of operating an FMCW radar device, said method comprising:
receiving from an external radar device a plurality of first FMCW chirp frames each having a first pattern of time slots, said first pattern comprising: a first time slot containing a first FMCW chirp; a second time slot containing a second FMCW chirp; and a plurality of FMCW chirp-free time slots; and
transmitting a plurality of second FMCW chirp frames each having a second pattern of time slots, said second pattern comprising: a first time slot containing a third FMCW chirp; a second time slot containing a fourth FMCW chirp; and a plurality of FMCW chirp-free time slots;
wherein the second pattern is selected such that when one of the FMCW chirps in a first FMCW chirp frame coincides in time with one of the FMCW chirps in a second FMCW chirp frame, the other FMCW chirp in said first FMCW chirp frame does not coincide in time with the other FMCW chirp in said second FMCW chirp frame;
said method further comprising:
a) mixing first signals from a received first FMCW chirp frame and a transmitted second FMCW chirp frame, said first signals corresponding to the time slot of the third FMCW chirp, thereby generating a first spectral response across an intermediate frequency band;
b) mixing second signals from the received first FMCW chirp frame and the transmitted second FMCW chirp frame, said second signals corresponding to the time slot of the fourth FMCW chirp, thereby generating a second spectral response across the intermediate frequency band;
c) determining a difference between the first and second spectral responses and determining whether said difference contains a tone in said intermediate frequency band;
d) when the difference does not contain a tone in said intermediate frequency band, applying a predetermined interval step to the transmission timing of the next second FMCW chirp frame; and
e) when the difference contains a tone in said intermediate frequency band, applying a variable dither to the transmission timing of the next second FMCW chirp frame, thereby driving a frequency of the tone toward a set point within the in-band frequency range.

The second aspect of the invention further extends to a computer software product comprising instructions that, when executed by a processor, cause the processor to carry out a method of operating an FMCW radar device, said method comprising:
receiving from an external radar device a plurality of first FMCW chirp frames each having a first pattern of time slots, said first pattern comprising: a first time slot containing a first FMCW chirp; a second time slot containing a second FMCW chirp; and a plurality of FMCW chirp-free time slots; and
transmitting a plurality of second FMCW chirp frames each having a second pattern of time slots, said second pattern comprising: a first time slot containing a third FMCW chirp; a second time slot containing a fourth FMCW chirp; and a plurality of FMCW chirp-free time slots;

wherein the second pattern is selected such that when one of the FMCW chirps in a first FMCW chirp frame coincides in time with one of the FMCW chirps in a second FMCW chirp frame, the other FMCW chirp in said first FMCW chirp frame does not coincide in time with the other FMCW chirp in said second FMCW chirp frame;

said method further comprising:
a) mixing first signals from a received first FMCW chirp frame and a transmitted second FMCW chirp frame, said first signals corresponding to the time slot of the third FMCW chirp, thereby generating a first spectral response across an intermediate frequency band;
b) mixing second signals from the received first FMCW chirp frame and the transmitted second FMCW chirp frame, said second signals corresponding to the time slot of the fourth FMCW chirp, thereby generating a second spectral response across the intermediate frequency band;
c) determining a difference between the first and second spectral responses and determining whether said difference contains a tone in said intermediate frequency band;
d) when the difference does not contain a tone in said intermediate frequency band, applying a predetermined interval step to the transmission timing of the next second FMCW chirp frame; and
e) when the difference contains a tone in said intermediate frequency band, applying a variable dither to the transmission timing of the next second FMCW chirp frame, thereby driving a frequency of the tone toward a set point within the in-band frequency range.

The second aspect of the invention also extends to a method of operating a frequency modulated continuous wave (FMCW) radar system comprising first and second FMCW radar devices, said method comprising:
transmitting via the first radar device a plurality of first FMCW chirp frames each having a first pattern of time slots, said first pattern comprising: a first time slot containing a first FMCW chirp; a second time slot containing a second FMCW chirp; and a plurality of FMCW chirp-free time slots;
receiving said plurality of first FMCW chirp frames at the second radar device;
transmitting via the second radar device a plurality of second FMCW chirp frames each having a second pattern of time slots, said second pattern comprising: a first time slot containing a third FMCW chirp; a second time slot containing a fourth FMCW chirp; and a plurality of FMCW chirp-free time slots;
selecting the second pattern such that when one of the FMCW chirps in a first FMCW chirp frame coincides in time with one of the FMCW chirps in a second FMCW chirp frame, the other FMCW chirp in said first FMCW chirp frame does not coincide in time with the other FMCW chirp in said second FMCW chirp frame;
said method further comprising:
a) mixing first signals from a received first FMCW chirp frame and a transmitted second FMCW chirp frame, said first signals corresponding to the time slot of the third FMCW chirp, thereby generating a first spectral response across an intermediate frequency band;
b) mixing second signals from the received first FMCW chirp frame and the transmitted second FMCW chirp frame, said second signals corresponding to the time slot of the fourth FMCW chirp, thereby generating a second spectral response across the intermediate frequency band;
c) determining a difference between the first and second spectral responses and determining whether said difference contains a tone in said intermediate frequency band;
d) when the difference does not contain a tone in said intermediate frequency band, applying a predetermined interval step to the transmission timing of the next second FMCW chirp frame; and
e) when the difference contains a tone in said intermediate frequency band, applying a variable dither to the transmission timing of the next second FMCW chirp frame, thereby driving a frequency of the tone toward a set point within the in-band frequency range.

The second aspect of the invention further extends to a non-transitory computer-readable medium comprising instructions that, when executed by a processor, cause the processor to carry out a method of operating a frequency modulated continuous wave (FMCW) radar system comprising first and second FMCW radar devices, said method comprising:
transmitting via the first radar device a plurality of first FMCW chirp frames each having a first pattern of time slots, said first pattern comprising: a first time slot containing a first FMCW chirp; a second time slot containing a second FMCW chirp; and a plurality of FMCW chirp-free time slots;
receiving said plurality of first FMCW chirp frames at the second radar device;
transmitting via the second radar device a plurality of second FMCW chirp frames each having a second pattern of time slots, said second pattern comprising: a first time slot containing a third FMCW chirp; a second time slot containing a fourth FMCW chirp; and a plurality of FMCW chirp-free time slots;
selecting the second pattern such that when one of the FMCW chirps in a first FMCW chirp frame coincides in time with one of the FMCW chirps in a second FMCW chirp frame, the other FMCW chirp in said first FMCW chirp frame does not coincide in time with the other FMCW chirp in said second FMCW chirp frame;
said method further comprising:
a) mixing first signals from a received first FMCW chirp frame and a transmitted second FMCW chirp frame, said first signals corresponding to the time slot of the third FMCW chirp, thereby generating a first spectral response across an intermediate frequency band;
b) mixing second signals from the received first FMCW chirp frame and the transmitted second FMCW chirp frame, said second signals corresponding to the time slot of the fourth FMCW chirp, thereby generating a second spectral response across the intermediate frequency band;
c) determining a difference between the first and second spectral responses and determining whether said difference contains a tone in said intermediate frequency band;
d) when the difference does not contain a tone in said intermediate frequency band, applying a predetermined interval step to the transmission timing of the next second FMCW chirp frame; and
e) when the difference contains a tone in said intermediate frequency band, applying a variable dither to the transmission timing of the next second FMCW chirp frame, thereby driving a frequency of the tone toward a set point within the in-band frequency range.

The second aspect of the invention further extends to a computer software product comprising instructions that, when executed by a processor, cause the processor to carry out a method of operating a frequency modulated continuous wave (FMCW) radar system comprising first and second FMCW radar devices, said method comprising:

transmitting via the first radar device a plurality of first FMCW chirp frames each having a first pattern of time slots, said first pattern comprising: a first time slot containing a first FMCW chirp; a second time slot containing a second FMCW chirp; and a plurality of FMCW chirp-free time slots;

receiving said plurality of first FMCW chirp frames at the second radar device;

transmitting via the second radar device a plurality of second FMCW chirp frames each having a second pattern of time slots, said second pattern comprising: a first time slot containing a third FMCW chirp; a second time slot containing a fourth FMCW chirp; and a plurality of FMCW chirp-free time slots;

selecting the second pattern such that when one of the FMCW chirps in a first FMCW chirp frame coincides in time with one of the FMCW chirps in a second FMCW chirp frame, the other FMCW chirp in said first FMCW chirp frame does not coincide in time with the other FMCW chirp in said second FMCW chirp frame;

said method further comprising:

a) mixing first signals from a received first FMCW chirp frame and a transmitted second FMCW chirp frame, said first signals corresponding to the time slot of the third FMCW chirp, thereby generating a first spectral response across an intermediate frequency band;

b) mixing second signals from the received first FMCW chirp frame and the transmitted second FMCW chirp frame, said second signals corresponding to the time slot of the fourth FMCW chirp, thereby generating a second spectral response across the intermediate frequency band;

c) determining a difference between the first and second spectral responses and determining whether said difference contains a tone in said intermediate frequency band;

d) when the difference does not contain a tone in said intermediate frequency band, applying a predetermined interval step to the transmission timing of the next second FMCW chirp frame; and e) when the difference contains a tone in said intermediate frequency band, applying a variable dither to the transmission timing of the next second FMCW chirp frame, thereby driving a frequency of the tone toward a set point within the in-band frequency range.

The Applicant has appreciated that the selection of the first and second patterns for the chirps produced by the first and second radar devices is novel and inventive in its own right. Thus, in accordance with a third aspect, embodiments of the present invention provide a frequency modulated continuous wave (FMCW) radar system comprising:

a first FMCW radar device configured to transmit a plurality of first FMCW chirp frames each having a first pattern of time slots, said first pattern comprising: a first time slot containing a first FMCW chirp; a second time slot containing a second FMCW chirp; and a plurality of FMCW chirp-free time slots; and a second FMCW radar device configured to transmit a plurality of second FMCW chirp frames each having a second pattern of time slots, said second pattern comprising: a first time slot containing a third FMCW chirp; a second time slot containing a fourth FMCW chirp; and a plurality of FMCW chirp-free time slots;

wherein the first and second patterns are selected such that when one of the FMCW chirps in a first FMCW chirp frame coincides in time with one of the FMCW chirps in a second FMCW chirp frame, the other FMCW chirp in said first FMCW chirp frame does not coincide in time with the other FMCW chirp in said second FMCW chirp frame.

The third aspect of the invention extends to an FMCW radar device configured to:

receive from an external radar device a plurality of first FMCW chirp frames each having a first pattern of time slots, said first pattern comprising: a first time slot containing a first FMCW chirp; a second time slot containing a second FMCW chirp; and a plurality of FMCW chirp-free time slots; and transmit a plurality of second FMCW chirp frames each having a second pattern of time slots, said second pattern comprising: a first time slot containing a third FMCW chirp; a second time slot containing a fourth FMCW chirp; and a plurality of FMCW chirp-free time slots;

wherein the second pattern is selected such that when one of the FMCW chirps in a first FMCW chirp frame coincides in time with one of the FMCW chirps in a second FMCW chirp frame, the other FMCW chirp in said first FMCW chirp frame does not coincide in time with the other FMCW chirp in said second FMCW chirp frame.

The third aspect of the invention also extends to a method of operating an FMCW radar device, said method comprising:

receiving from an external radar device a plurality of first FMCW chirp frames each having a first pattern of time slots, said first pattern comprising: a first time slot containing a first FMCW chirp; a second time slot containing a second FMCW chirp; and a plurality of FMCW chirp-free time slots;

transmitting a plurality of second FMCW chirp frames each having a second pattern of time slots, said second pattern comprising: a first time slot containing a third FMCW chirp; a second time slot containing a fourth FMCW chirp; and a plurality of FMCW chirp-free time slots; and selecting the second pattern such that when one of the FMCW chirps in a first FMCW chirp frame coincides in time with one of the FMCW chirps in a second FMCW chirp frame, the other FMCW chirp in said first FMCW chirp frame does not coincide in time with the other FMCW chirp in said second FMCW chirp frame.

The third aspect of the invention further extends to a non-transitory computer-readable medium comprising instructions that, when executed by a processor, cause the processor to carry out a method of operating an FMCW radar device, said method comprising:

receiving from an external radar device a plurality of first FMCW chirp frames each having a first pattern of time slots, said first pattern comprising: a first time slot containing a first FMCW chirp; a second time slot containing a second FMCW chirp; and a plurality of FMCW chirp-free time slots;

transmitting a plurality of second FMCW chirp frames each having a second pattern of time slots, said second pattern comprising: a first time slot containing a third FMCW chirp; a second time slot containing a fourth FMCW chirp; and a plurality of FMCW chirp-free time slots; and selecting the second pattern such that when one of the FMCW chirps in a first FMCW chirp frame coincides in time with one of the FMCW chirps in a second FMCW chirp frame, the other FMCW chirp in said first FMCW chirp frame does not coincide in time with the other FMCW chirp in said second FMCW chirp frame.

The third aspect of the invention further extends to a computer software product comprising instructions that, when executed by a processor, cause the processor to carry out a method of operating an FMCW radar device, said method comprising:

receiving from an external radar device a plurality of first FMCW chirp frames each having a first pattern of time slots, said first pattern comprising: a first time slot containing a first FMCW chirp; a second time slot containing a second FMCW chirp; and a plurality of FMCW chirp-free time slots;

transmitting a plurality of second FMCW chirp frames each having a second pattern of time slots, said second pattern comprising: a first time slot containing a third FMCW chirp; a second time slot containing a fourth FMCW chirp; and a plurality of FMCW chirp-free time slots; and selecting the second pattern such that when one of the FMCW chirps in a first FMCW chirp frame coincides in time with one of the FMCW chirps in a second FMCW chirp frame, the other FMCW chirp in said first FMCW chirp frame does not coincide in time with the other FMCW chirp in said second FMCW chirp frame.

The third aspect of the invention also extends to a method of operating a frequency modulated continuous wave (FMCW) radar system comprising first and second FMCW radar devices, said method comprising:

transmitting via the first radar device a plurality of first FMCW chirp frames each having a first pattern of time slots, said first pattern comprising: a first time slot containing a first FMCW chirp; a second time slot containing a second FMCW chirp; and a plurality of FMCW chirp-free time slots;

receiving said plurality of first FMCW chirp frames at the second radar device;

transmitting via the second radar device a plurality of second FMCW chirp frames each having a second pattern of time slots, said second pattern comprising: a first time slot containing a third FMCW chirp; a second time slot containing a fourth FMCW chirp; and a plurality of FMCW chirp-free time slots; and selecting the second pattern such that when one of the FMCW chirps in a first FMCW chirp frame coincides in time with one of the FMCW chirps in a second FMCW chirp frame, the other FMCW chirp in said first FMCW chirp frame does not coincide in time with the other FMCW chirp in said second FMCW chirp frame.

The third aspect of the invention further extends to a non-transitory computer-readable medium comprising instructions that, when executed by a processor, cause the processor to carry out a method of operating a frequency modulated continuous wave (FMCW) radar system comprising first and second FMCW radar devices, said method comprising:

transmitting via the first radar device a plurality of first FMCW chirp frames each having a first pattern of time slots, said first pattern comprising: a first time slot containing a first FMCW chirp; a second time slot containing a second FMCW chirp; and a plurality of FMCW chirp-free time slots;

receiving said plurality of first FMCW chirp frames at the second radar device;

transmitting via the second radar device a plurality of second FMCW chirp frames each having a second pattern of time slots, said second pattern comprising: a first time slot containing a third FMCW chirp; a second time slot containing a fourth FMCW chirp; and a plurality of FMCW chirp-free time slots; and selecting the second pattern such that when one of the FMCW chirps in a first FMCW chirp frame coincides in time with one of the FMCW chirps in a second FMCW chirp frame, the other FMCW chirp in said first FMCW chirp frame does not coincide in time with the other FMCW chirp in said second FMCW chirp frame.

The third aspect of the invention further extends to a computer software product comprising instructions that, when executed by a processor, cause the processor to carry out a method of operating a frequency modulated continuous wave (FMCW) radar system comprising first and second FMCW radar devices, said method comprising:

transmitting via the first radar device a plurality of first FMCW chirp frames each having a first pattern of time slots, said first pattern comprising: a first time slot containing a first FMCW chirp; a second time slot containing a second FMCW chirp; and a plurality of FMCW chirp-free time slots;

receiving said plurality of first FMCW chirp frames at the second radar device;

transmitting via the second radar device a plurality of second FMCW chirp frames each having a second pattern of time slots, said second pattern comprising: a first time slot containing a third FMCW chirp; a second time slot containing a fourth FMCW chirp; and a plurality of FMCW chirp-free time slots; and selecting the second pattern such that when one of the FMCW chirps in a first FMCW chirp frame coincides in time with one of the FMCW chirps in a second FMCW chirp frame, the other FMCW chirp in said first FMCW chirp frame does not coincide in time with the other FMCW chirp in said second FMCW chirp frame.

In some embodiments of the third aspect of the invention, the second FMCW radar device is further configured to:

a) mix first signals from a received first FMCW chirp frame and a transmitted second FMCW chirp frame, said first signals corresponding to the time slot of the third FMCW chirp, thereby generating a first spectral response; and b) mix second signals from the received first FMCW chirp frame and the transmitted second FMCW chirp frame, said second signals corresponding to the time slot of the fourth FMCW chirp, thereby generating a second spectral response.

In a set of such embodiments, the second FMCW radar device is further configured to:

c) determine a difference between the first and second spectral responses and determine whether said difference contains a tone having a signal power greater than a predetermined threshold within an in-band frequency range.

In a set of such embodiments, the second FMCW radar device is further configured to:

d) when the difference does not contain a tone having a signal power greater than the predetermined threshold within the in-band frequency range, the second FMCW radar device applies a predetermined interval step to the transmission timing of the next second FMCW chirp frame.

Additionally, or alternatively, in a set of embodiments, the second FMCW radar device is further configured to:
e) when the difference contains a tone having a signal power greater than the predetermined threshold within the in-band frequency range, the second FMCW radar device applies a variable dither to the transmission timing of the next second FMCW chirp frame, thereby driving a frequency of the tone toward a set point within the in-band frequency range.

It will be appreciated that the optional features described hereinabove in respect of embodiments of the first aspect of the invention also apply to the second and third aspects of the invention.

Where technically appropriate, embodiments of the invention may be combined. In the context of this specification "comprising" is to be interpreted as "including". Aspects of the invention comprising certain elements are also intended to extend to alternative embodiments "consisting of" or "consisting essentially of" the relevant elements.

Technical references such as patents and applications are incorporated herein by reference.

Any embodiments specifically and explicitly recited herein may form the basis of a disclaimer either alone or in combination with one or more further embodiments.

BRIEF DESCRIPTION OF THE DRAWINGS

Certain embodiments of the present invention will now be described with reference to the accompanying drawings, in which.

DETAILED DESCRIPTION OF THE PREFERRED EMBODIMENTS

Figure 1:
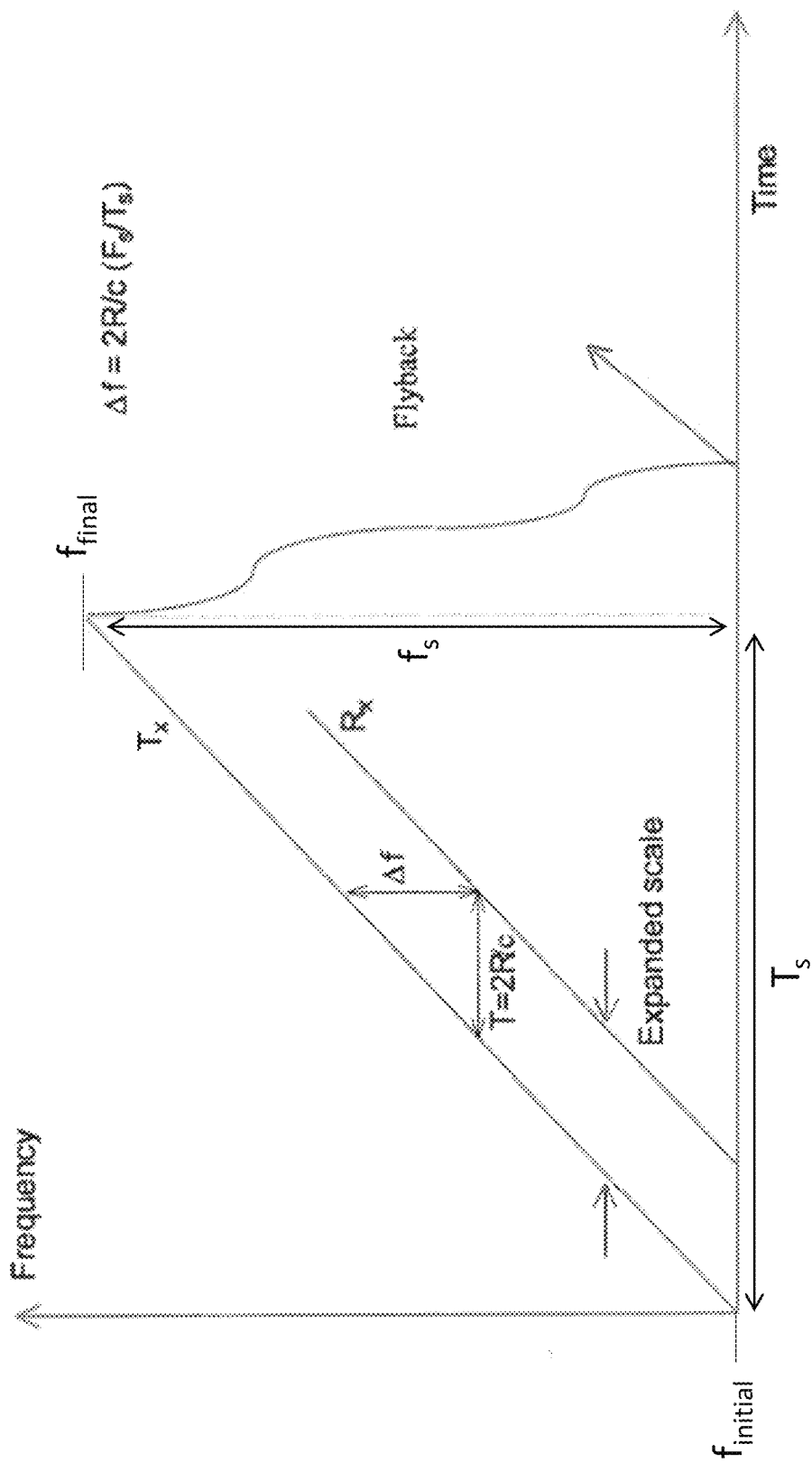
FIG. 1 is a graph illustrating the operation behind an FMCW radar system.

FIG. 1 is a graph illustrating the operation behind an FMCW radar system by way of background explanation. As can be seen from FIG. 1, the graph illustrates frequency as a function of time and shows two plots—a transmitted signal '$T_x$' and a received reflected signal '$R_x$', which lags behind $T_x$ in time. It will be appreciated that FIG. 1 is merely exemplary and shows an expanded time scale for ease of understanding.

In each cycle of the radar, a 'chirp' is transmitted, in which the frequency of the transmitted signal $T_x$ is varied (modulated) over time. In this particular example, a linearly increasing ramp in frequency is used to produce the chirp. Thus the chirp is characterised by a sweep time $T_s$ and a swept frequency $f_s$.

The term 'sweep time' $T_s$ means the time period over which the frequency varies, i.e. the length of the chirp.

The term 'swept frequency' $f_s$ means the difference in frequency between the initial frequency $f_{initial}$ of the chirp and the final frequency $f_{final}$ of the chirp.

Reflections of the chirp are then received $R_x$, with the time difference being due to the return-time-of-flight of that signal (i.e. the time taken from the signal to radiate to the reflector, and then for the reflection to radiate back to the radar).

The time of flight between a transmitted radar signal and reception again of that signal having reflected off an object in front of the transmitter can be used to measure range as per Equation 1 below:

$$\text{Range} = \frac{T \cdot c}{2}$$

Equation 1: Time of Flight for Radar Signal where c is the speed of electromagnetic radiation and T is the time between transmission and reception. This gives a single range measurement to the first reflector that satisfies threshold detection criteria.

Those skilled in the art will appreciate that FMCW radar systems utilise a continuous transmission (or 'radiation') of RF power (hence 'continuous wave'), during which the frequency of the RF transmission is modulated (i.e. varied). In an FMCW radar, transmitted and received signals are combined in a microwave mixer. One of the products of this mixing is the frequency difference between the signals, known as the intermediate frequency (IF or $\Delta f$). By way of example, FIG. 1 is a graph illustrating a radar having a baseband that is frequency modulated over a 600 MHz range (i.e. the sweep frequency $f_s$=600 MHz) in a period of 1 ms (i.e. the sweep time $T_s$=1 ms).

The difference in frequency $\Delta f$ between the transmitted signal and the reflected signal (shown on an expanded time scale in FIG. 1) is determined by Equation 2 below:

$$\Delta f = \frac{2 \cdot \text{Range} \cdot f_s}{c \cdot T_s}$$

Equation 2: Intermediate Frequency Determined from Reflected Signal where T s is the sweep time and $f_s$ is the swept frequency. This follows from the time between transmitted and received signals, and the rate of change of frequency with time, fs/Ts. The intermediate frequency $\Delta f$ is a measure of the target distance according to Equation 3 below:

$$\text{Range} = \frac{c \cdot T_s}{2 \cdot f_s} \cdot \Delta f$$

Equation 3: Range as a Function of Intermediate Frequency

It will be appreciated that after a particular chirp, a 'flyback' procedure is used to 'reset' the transmitter to its initial frequency value for the next chirp.

Figure 2:
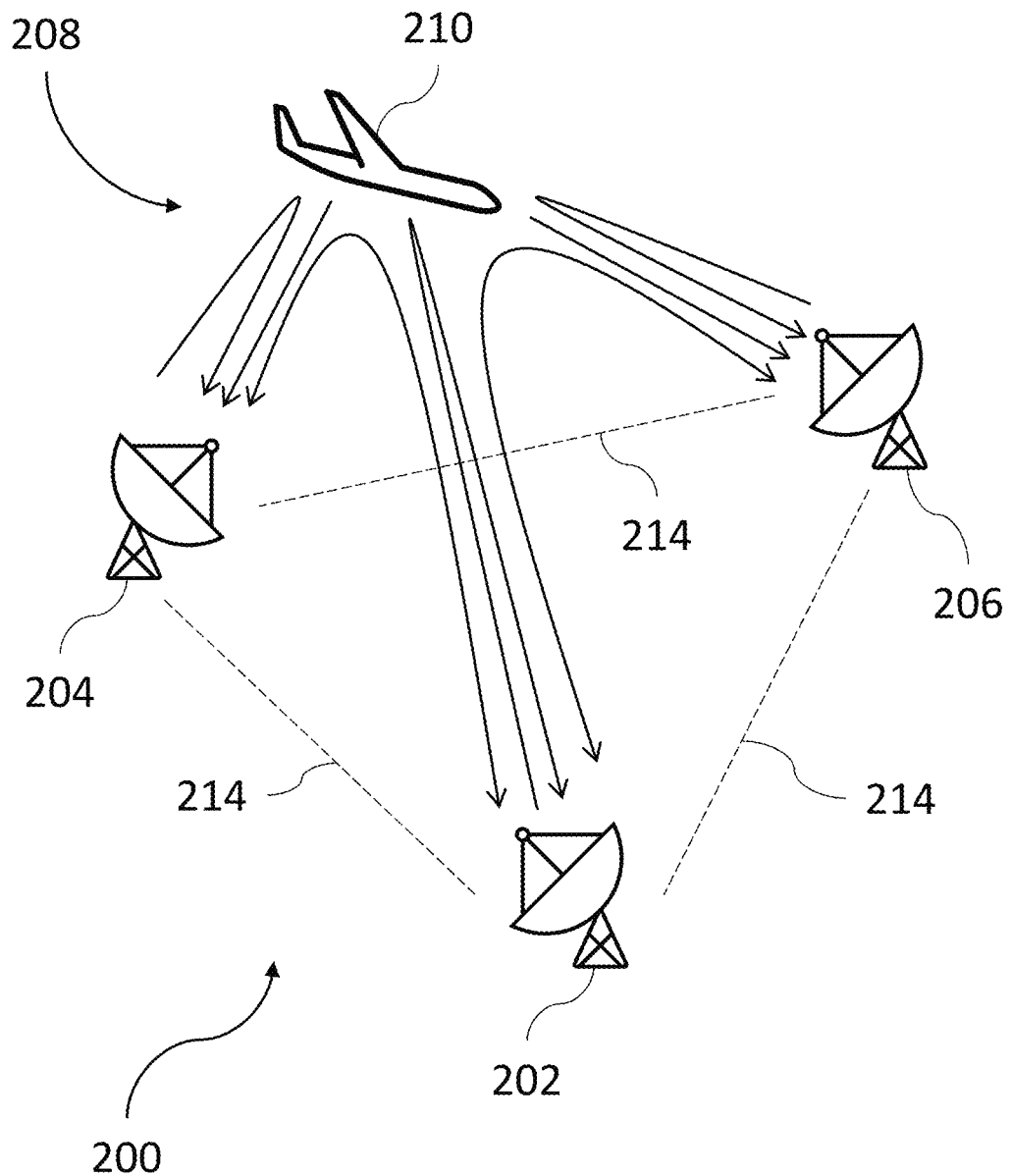
FIG. 2 is a schematic diagram illustrating an exemplary prior art multistatic FMCW radar system.

FIG. 2 is a schematic diagram illustrating an exemplary prior art FMCW radar system 200. In particular, the radar system 200 includes a master radar device 202 and two slave radar devices 204, 206, where these radar devices 202, 204, 206 work together to monitor a particular airspace 208. Also shown in FIG. 2 is an aircraft 210 in that airspace 208, which is a target to be tracked by the radar system 200.

In order to co-ordinate transmission timings, the radar devices 202, 204, 206 are connected to one another via a series of cables 214. In other arrangements, known in the art per se, these cables could be avoided by providing a wireless communication channel link between the devices 202, 204, 206 or by equipping each of the devices with a mechanism for obtaining timing from an external source, e.g. using a GPS clock.

Figure 3:
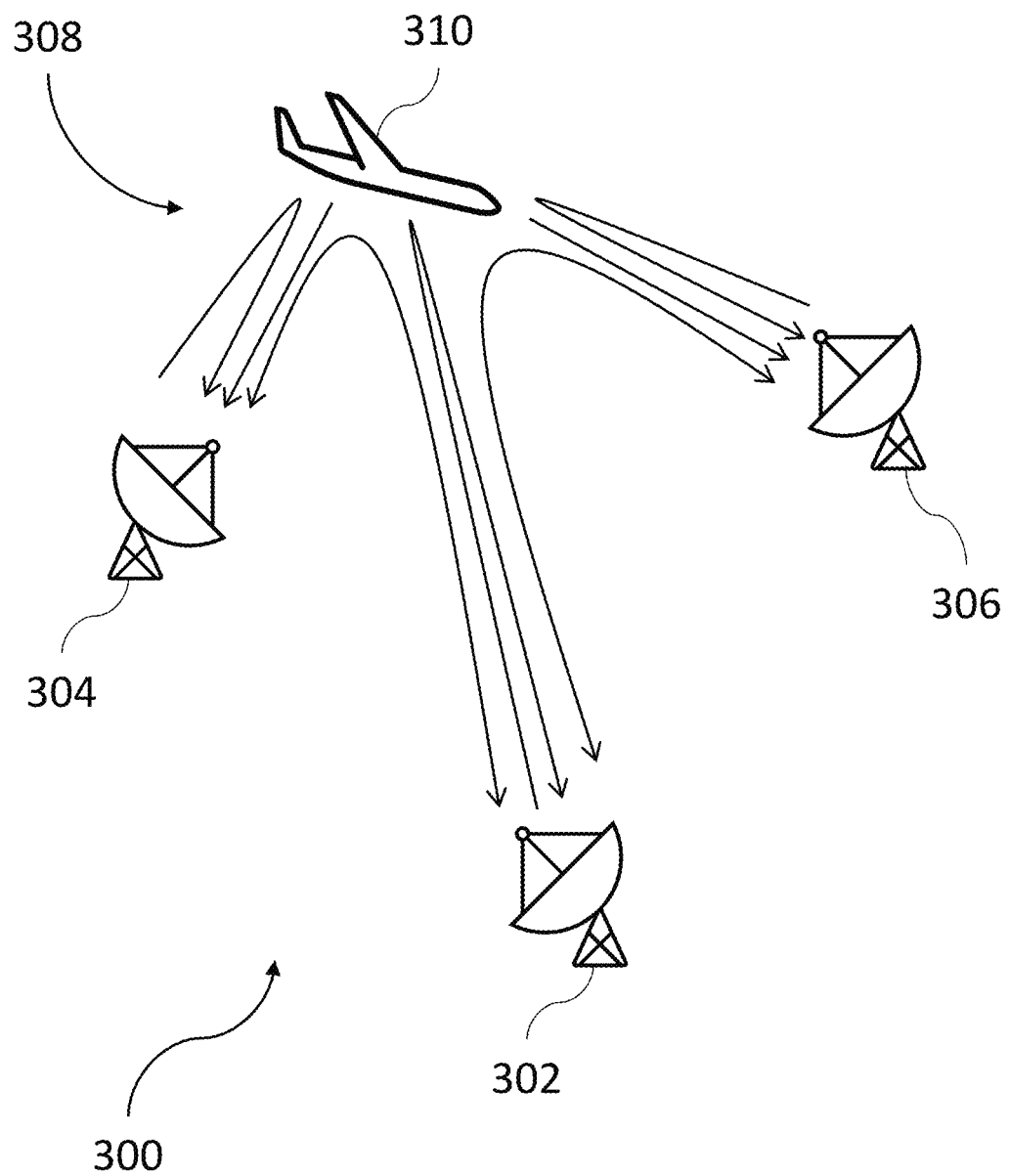
FIG. 3 is a schematic diagram illustrating a multistatic FMCW radar system in accordance with an embodiment of the present invention.

FIG. 3 is a schematic diagram illustrating an exemplary FMCW radar system 300 in accordance with an embodiment of the present invention. Similarly to the prior art radar system 200 of FIG. 2, the radar system 300 of FIG. 3 includes a 'master' radar device 302 and two 'slave' radar devices 304, 306, where these radar devices 302, 304, 306 work together to monitor a particular airspace 308. Also shown in FIG. 3 is an aircraft 310 in that airspace 308, which is a target to be tracked by the radar system 300.

Unlike the prior art radar system 200 of FIG. 2, it can be seen that the radar system 300 of FIG. 3 does not have any dedicated connections between the radar devices 302, 304, 306. Instead, synchronisation is achieved by operating the radar system 300 in accordance with the process explained with reference to FIGS. 6 to 14 below.

Figure 4:
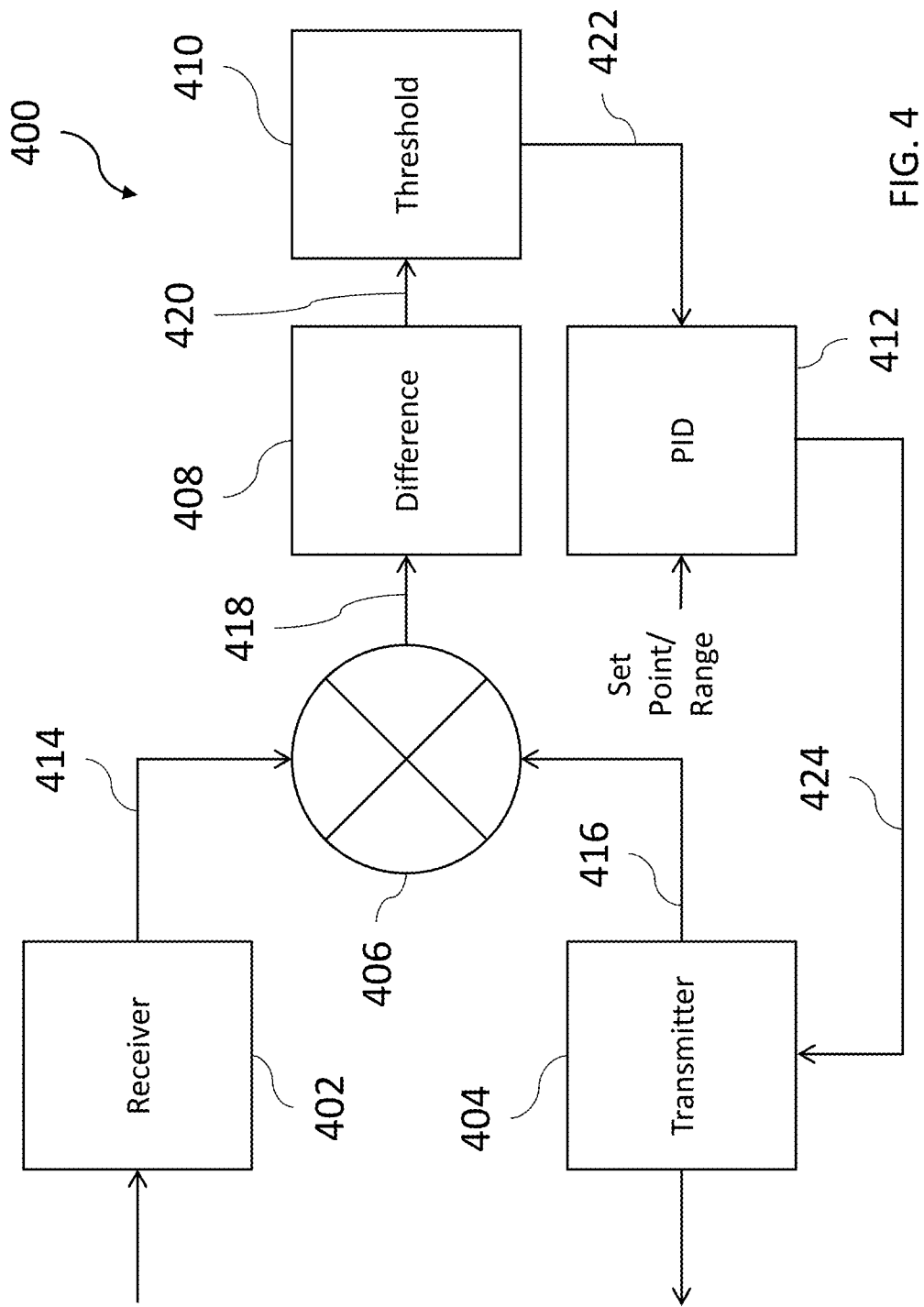
FIG. 4 is a block diagram of an FMCW radar device in accordance with an embodiment of the present invention.

FIG. 4 is a block diagram of an FMCW radar device 400 in accordance with an embodiment of the present invention. In particular, the structure of the FMCW radar device 400 in FIG. 4 may be suitable for implementing the slave radar devices 304, 306 discussed above in respect of FIG. 3.

It will be appreciated that the structure shown in FIG. 4 is highly simplified for ease of understanding, and that in practice an FMCW radar device may have a different or more complex structure while still embodying the principles of the present invention. The structural and functional components shown may be embodied within distinct hardware or software components or modules, or some or all of these functions may be carried out within shared hardware (e.g. multiple functions may be carried out by a single processing unit).

The FMCW radar device 400 includes a receiver 402, a transmitter 404, a mixer 406, a difference calculator 408, a threshold comparator 410, and a PID controller 412.

The receiver 402 is configured to receive FMCW chirp frames transmitted by an external radar device, e.g. the master radar device 302 of FIG. 3, as a received signal 414.

The transmitter 404 is configured to transmit FMCW chirp frames. A local copy of the transmitted signal 416 is sent to the mixer 406.

The mixer 406 mixes the received signal 414 from the receiver 402 and the copy of the transmitted signal 416 from the transmitter 404 to produce a spectral response 418 for a particular time slot. It will be appreciated that these spectral responses 418 will be generated for different time slots, as outlined in more detail below.

Spectral responses 418 from different time slots (and in particular for the time slots in which the transmitter 404 transmits a chirp) are fed to the difference calculator 408 which determines the difference 420 between the spectral responses 418. It will be appreciated that there may be a number of ways of performing this difference operation, known in the art per se, however in a simple example a subtraction operation may be performed, e.g. on a logarithmic scale, to subtract one spectral response from the other.

The difference 420 in spectral responses is input to the threshold comparator 410, which performs a peak detection process to look for a tone (or peak) having a signal power greater than a predetermined threshold, as explained in more detail with respect to FIG. 5 later. If a peak is not detected, i.e. if there is no in-band tone, the search phase continues, with the transmission timing being stepped by a time window corresponding to the in-band frequency range, i.e. the IF band.

The output 422 of the threshold comparator 410 is provided to the PID controller 412 which uses a PID control loop to carry out the coarse lock and fine lock processes outlined later. In brief, the PID controller 412 seeks to drive the frequency of the tone (once present) to a particular set point or range (the coarse lock process), and to adjust the initial frequency of the chirps transmitted by the transmitter 404 (the fine lock process) as discussed below. To achieve this, the PID controller 412 supplies suitable control signals 424 to the transmitter 404 to adjust its timing (by applying a dither) and/or initial start frequency (which equivalently changes the effective start time of the chirp), as appropriate.

Figure 6:
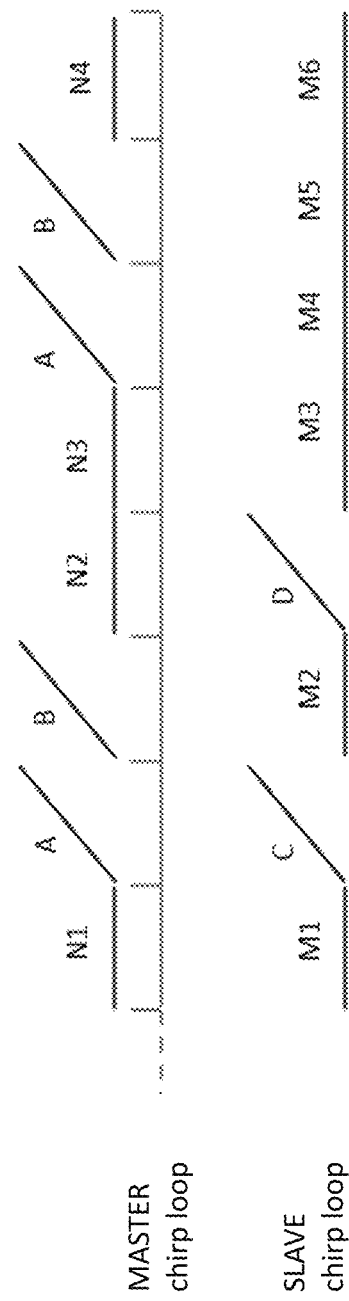
FIG. 6 is a plot illustrating chirp loops for the master and slave radar devices.

FIG. 6 shows the independent chirp sequences for the master radar (e.g. the master radar device 302 of FIG. 3) and the slave radar (e.g. the slave radar 304 and/or 306 of FIG. 3) that will synchronise to it. It will be appreciated that references to the "slave radar 304, 306" below refers to either of these slave radar devices in isolation, but that the functionality of these devices is the same.

As can be seen from FIG. 6, each radar device 302, 304, 306 produces respective chirps in certain time frames. In particular, each device 302, 304, 306 is configured to produce a pair of chirps within a given frame (i.e. time period). Specifically, the master radar 302 produces a first chirp pair A and B, while the slave radar 304, 306 produces a second chirp pair C and D.

Time slots containing a chirp A, B, C, D are illustrated in FIGS. 6 to 14 with a diagonal line, representing the change in frequency over time associated with the chirp. Chirp-free (or 'no-chirp') time slots are illustrated as a horizontal line and are denoted 'Nx' for the chirp-free time slots of the master radar 302 and 'Mx' for the chirp-free time slots of the slave radar 304, 306, where the 'x' in 'Nx' and 'Mx' is replaced by a numeric index unique to that time slot for ease of reference.

It can be seen from FIG. 6 that the chirp pattern used by the master radar 302 and the chirp pattern used by the slave radars 304, 306 are selected such that it is impossible to overlay the two chirp patterns on top of one another in time and have both A and B in the first chirp frame (of the master radar 300) coincide in time with C and D in the second chirp frame (of the slave radar 304, 306). The chirp patterns are periodic (i.e. they repeat after a fixed period of time).

The slave radar 304, 306 receives the chirps transmitted by the master radar 302 and is configured to mix the signal received from the master radar 302 with a local copy of the signal transmitted by the slave radar 304, 306. This mixing is performed at the chirp transmission times of the slave radar 304, 306, i.e. at the times of C and D in the second chirp frame. As outlined previously, mixing these signals produces a spectral response in an IF band, the spectral response containing the difference in frequency between the two signals.

Figure 5:
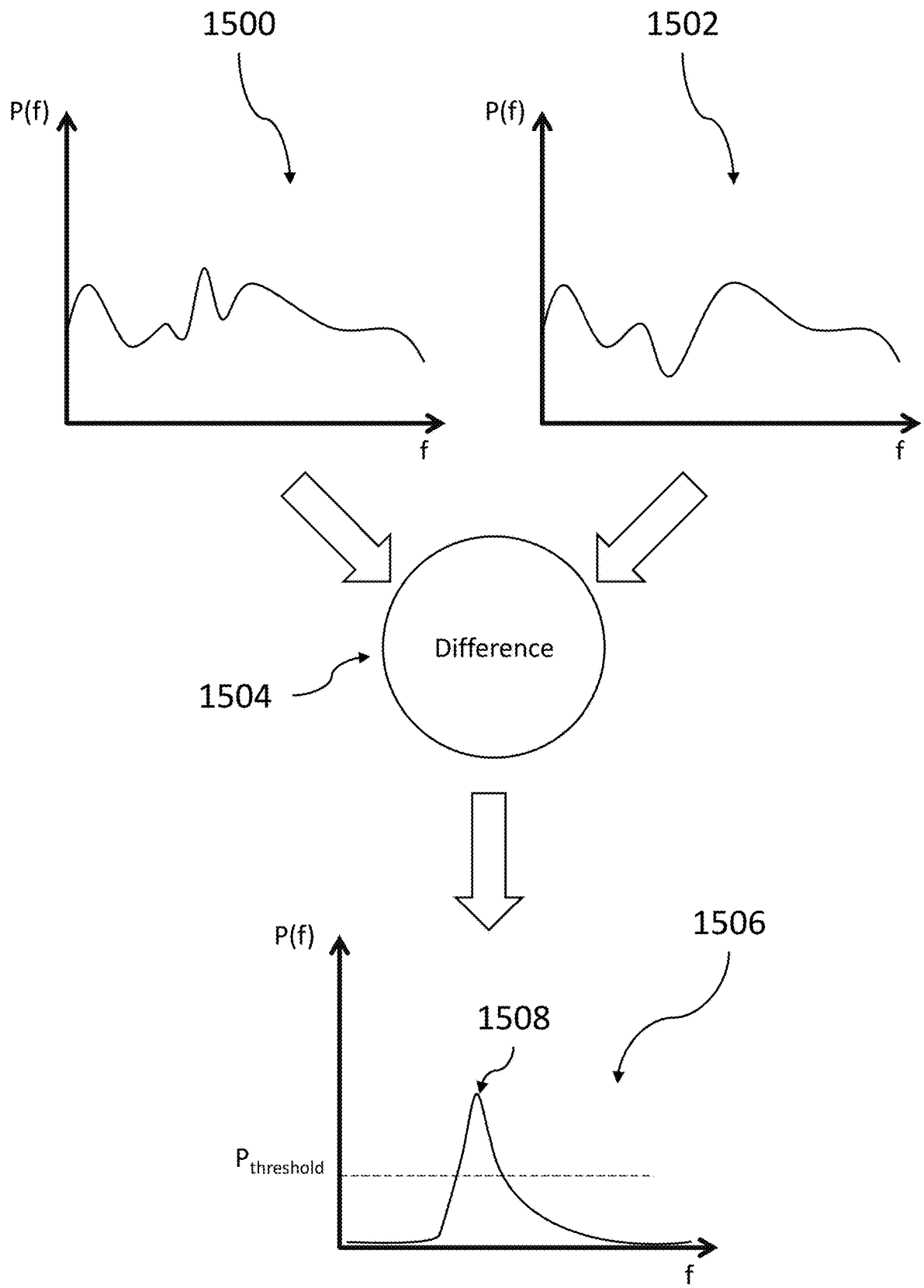
FIG. 5 is an illustration of the spectral responses and difference between them used to detect whether a tone indicative of synchronisation is present.

An illustrative example of these spectral responses and the difference between them is shown in FIG. 5. As can be seen from FIG. 5, the two mixing operations result in a first spectral response 1500 and a second spectral response 1502. Each spectral response shows the signal power P(f) of each component frequency f within the IF band.

It will be appreciated that the example of FIG. 5 is provided for illustrative purposes only, and in practice the spectral responses and tone may appear differently. Similarly, the tone may be present in the second spectral response rather than the first, in neither, or in both, depending on the nature of the chirp patterns and whether the radar devices are synchronised or not.

In this particular example, the first spectral response 1500 corresponds to chirps from the respective radar devices coinciding in time and thus contains an in-band tone superimposed on the background reflection response, while the second spectral response 1502 corresponds to background reflections only.

These two spectral responses 1500, 1502 are subject to a difference process 1504 which produces a difference response 1506. This difference response 1506 contains the peak 1508 corresponding to the in-band tone indicative of synchronisation, which can be detected by applying a thresholding process using an appropriate signal power threshold $P_{threshold}$.

The example of FIG. 5 corresponds to the situation shown in FIG. 6, in which mixing chirps A and C (which in this case coincide in time) at the slave radar 304, 306 will result in a tone in the spectral response (at the slave radar 304, 306) that is proportional to the relative chirp start time offset of C and A.

It will be appreciated that the spectral response will also contain components arising from reflections off background objects, i.e. 'spurious' or unwanted reflections. All objects in the scene (e.g. radar reflectors, trees, cars, people, etc.) will typically give rise to a response in a frequency modulated chirp.

In the next chirp at the slave radar 304, 306, the mixer mixes the local chirp D with a chirp-free time slot N2 from the master radar 302, which will not generate a tone, because N2 is not a chirp slot at the master radar 302. Nevertheless, there will still be a response due to the background from D.

Taking the difference between spectral responses from the two periods at C and D will yield the tone (from the mixing of A and C) and remove the effect of background responses since the background responses are present in both the time slot of A and C and the time slot of D and N2.

This tone is then controlled to set point frequency though a coarse dithering of the start time of the slave radar sequence, and fine lock frequency adjustment, in a PID-controlled scheme as described below.

At the master radar 302 there is no dynamic adjustment of the chirp start time, these occur at set times according to a particular schedule. The two chirps A and B are used to measure the range from the slave radar to the master radar. The chirps A and C are mixed at the master radar 302, resulting in a spectral response that includes a tone and the background. The tone is proportional to the time delay time-of-flight from C to A only. It is important to remember that, in accordance with the process described herein, at this stage the slave radar 304, 306 has already independently ensured that it is synchronised to the master radar 302.

In the next sampling period at the master radar 302, mixing B with M2 (a chirp-free slot at the slave radar 304, 306) does not yield a tone but only a background response. The difference between the spectral responses over these two periods yields a tone that is proportional to the separation between master radar 302 and the slave radar 304, 306. The background reflection response is removed during the difference process as it appears in both the time slot of A and C and the time slot of B and M2.

Figure 7:
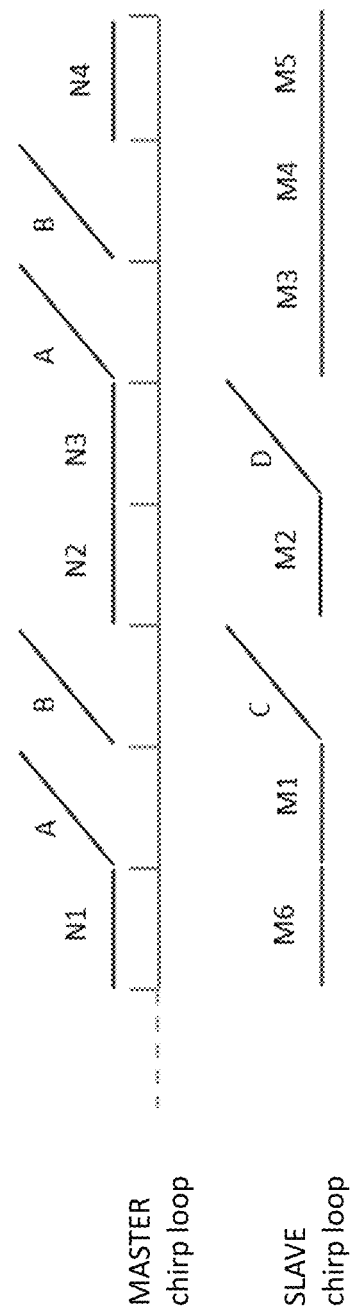
FIG. 7 is a plot illustrating chirp loops for the master and slave radar devices where a first chirp for the slave aligns in time with a second chirp for the master.

FIG. 7 shows that this scheme works equally well when the master radar 302 and slave radar 304, 306 are a whole period out of sync. At the secondary radar 304, 306, mixing at the time slot of B and C yields a tone, while the mixing at the time slot of D and N3 does not. The difference between the spectral responses across both periods again yields a tone that is used to synchronise the slave radar 304, 306 with the master radar 302, background effects are cancelled as shown in the earlier example. The difference between the spectral response from mixing A and M1 (which produces no tone) and the spectral response from mixing B and C (tone) is used at the master radar 302 to measure range. The frequency position of the tone in the spectral response is proportional to the range distance between the master radar 302 and the slave radar 304, 306.

It should be noted that while in the accompanying drawings the 'chirp-free' slots N1 to N4 and M1 to M6 are shown to be of the same time duration as the chirping slots A to D, in practice the chirp-free slots may be much shorter than the chirp slots, so long as they are long enough to move out of band any tone generated that does not relate to a required master/slave pairing for synchronisation (i.e. for performing ranging). This would improve the time efficiency of the scheme with more measurements per period.

Figure 8:
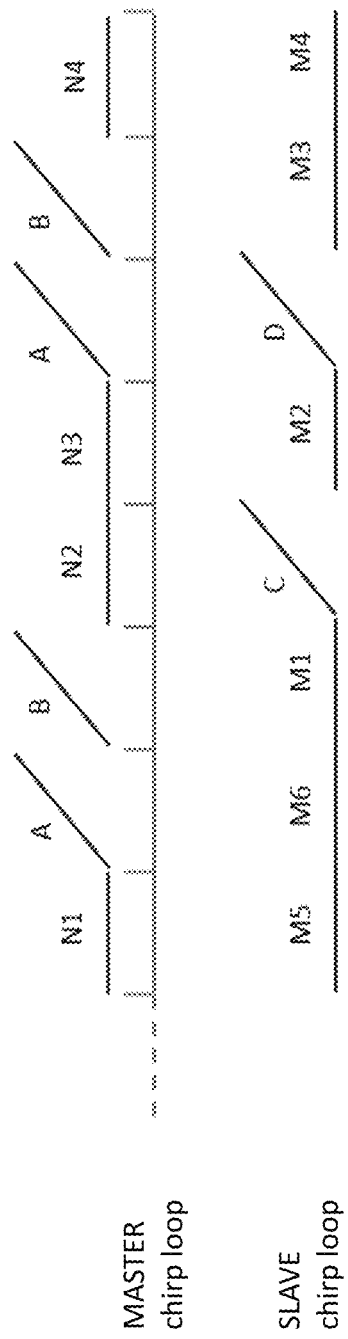
FIG. 8 is a plot illustrating chirp loops for the master and slave radar devices where a second chirp for the slave aligns in time with a first chirp for the master.

As shown in FIG. 8, if the slave radar 304, 306 is a further period out of synchronisation with the master radar 302, then the difference between the spectral response from mixing C and N2 and the spectral response from mixing D and A is used to lock the slave radar 304, 306. The difference between the spectral response from mixing A and D and the spectral response from mixing B and M3 to measure range at the master radar 302.

An advantage of this approach, as shown in FIGS. 6 to 8, is that a slave radar 304, 306 can only synchronise with a master radar 302. Additionally, the radars are robustly distinguishable to one another, i.e. they can be detected distinctly from any spurious background reflections. As per the accompanying drawings, the chirp loop of a first slave radar 304 is referred to as "SLAVE #1 chirp loop" and the chirp loop of a second slave radar 306 is referred to as "SLAVE #2 chirp loop".

This is advantageous as it allows multiple slave radar devices 304, 306 to operate and synchronise with a single master radar 302, without running the risk of their inadvertent synchronising with each other (which would be undesirable), even if operating on the same band. This is achieved through the particular arrangement of chirp pairs and chirp-free slots in the chirp frame designs at both the master radar 302 and the multiple slave radars 304, 306.

In the particular embodiment shown in FIGS. 9 to 12, the chirp patterns for both slave radars 304, 306 are the same, and alternate between chirp and chirp-free time slots. As a result of this, regardless of any offset in the number of time slots between the transmissions of the two slave radar devices 304, 306, the slave radar devices 304, 306 are unable to synchronise with each other, as explained in more detail below.

Figure 9:
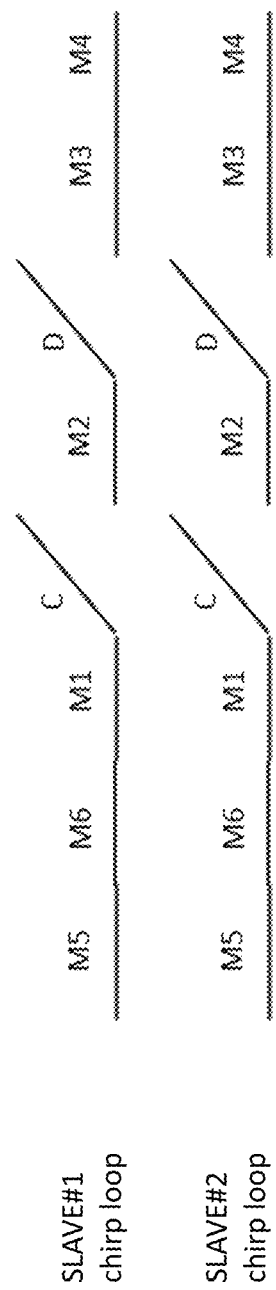
FIG. 9 is a plot illustrating chirp loops for the two slave radar devices, aligned in time.

As can be seen in FIG. 9, if the chirp patterns of the two slave radar devices 304, 306 are completely aligned in time, then slot C from one slave radar device 304 is mixed with slot C from the other slave radar device 306, and vice versa. Similarly, slot D from one slave radar device 304 is mixed with slot D from the other slave radar device 306, and vice versa. The spectral responses from both mixes are identical, and thus when the difference is taken, they cancel out and no tone is obtained, thereby preventing synchronisation.

Figure 10:
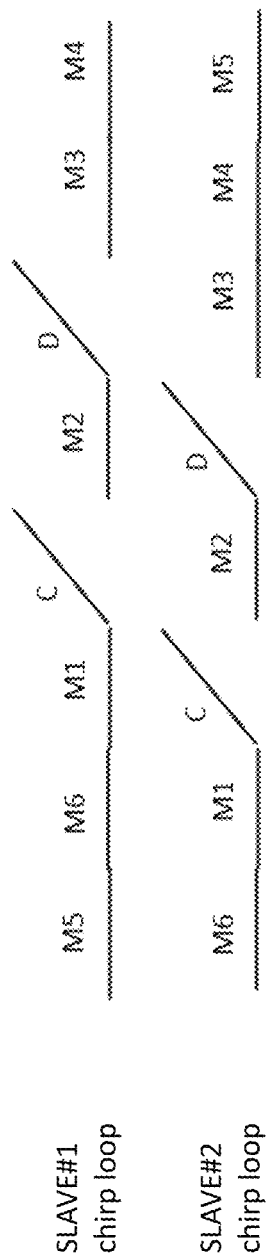
FIG. 10 is a plot illustrating chirp loops for the two slave radar devices, where the chirp loops are out of alignment by one time slot.

FIG. 10 shows a scenario in which the transmissions of the two slave radar devices 304, 306 are one time slot out of sync (with the first slave radar device 304 lagging the second slave radar device 306 by one time slot). In both cases, the mixing of the time slots at C and D at either slave radar device 304, 306 will be with chirp-free time slots from the other slave radar device 304, 306, and so the spectral responses in both cases will be equal and therefore cancel when the difference is taken.

Figure 11:
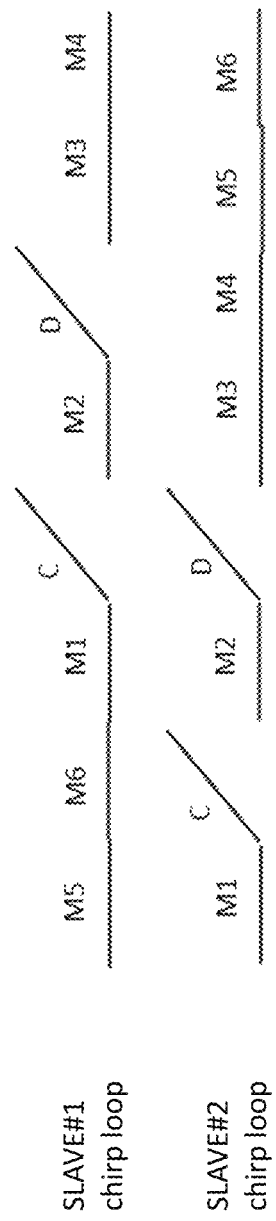
FIG. 11 is a plot illustrating chirp loops for the two slave radar devices, where the chirp loops are out of alignment by two time slots.

FIG. 11 shows an edge case which will give a tone, but should not. The difference between the spectral response obtained by mixing slot C from the second slave radar device 306 with the chirp-free slot M6 from the first slave radar device 304, and the spectral response obtained by mixing slot D from the second slave radar device 306 with the chirp slot C from the first slave radar device 304 will yield a tone, potentially leading to unwanted synchronisation between the two slave radar devices 304, 306.

Figure 12:
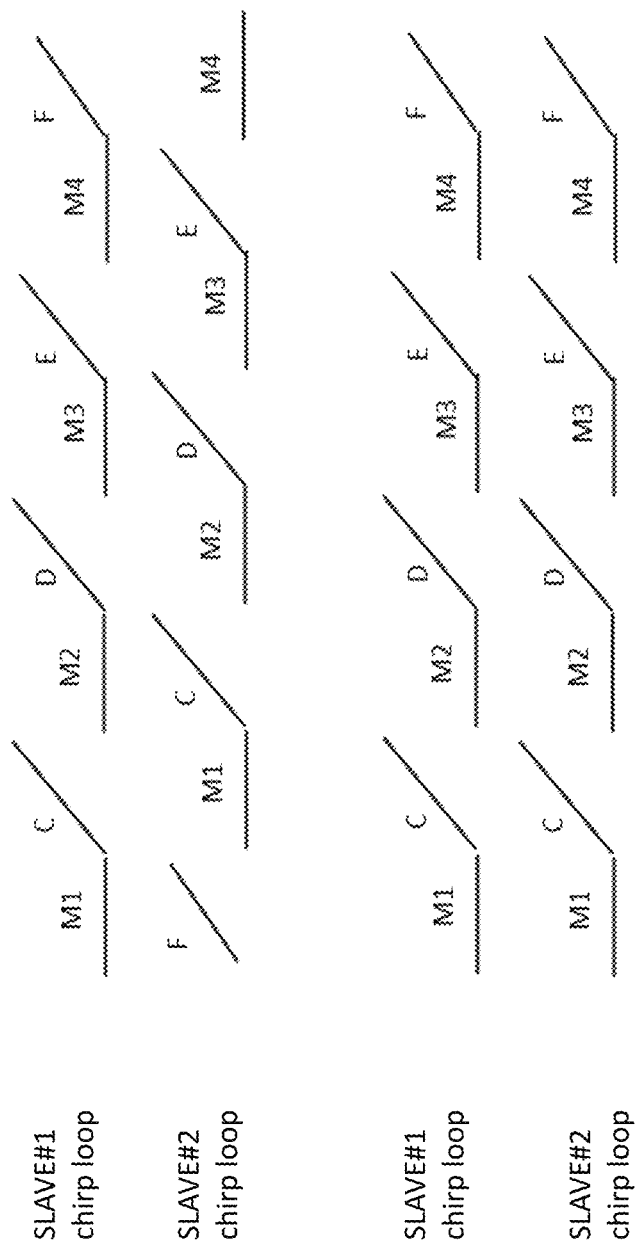
FIG. 12 is a plot illustrating an alternative chirp loop pattern for the two slave radar devices to avoid slave-to-slave synchronisation.

To overcome this potential issue, a modified slave chirp sequence is shown in FIG. 12 that overcomes this edge case and maintains all other capability. In particular, the chirp pattern is selected such that it has a duty cycle of 50% with alternating chirp time slots C-F and chirp-free time slots M1-M4.

The process of locking the slave radar 304, 306 chirps to the master radar 302 chirps described above may be used an initial 'coarse locking' process, which can then be followed by a 'fine lock' process, as outlined below. This two-stage process is designed to first case ensure that the tones are in band (during a search phase), and then to use the coarse and fine lock processes to control the tone at the slave radar 304, 306 to a setpoint in that band (during a locking phase).

In practice this technique supports chirp alignments with <100 picosecond accuracy, which can advantageously result in a range measurement resolution in the order of a centimetre. Such performance may be superior to the range measurement resolution that can be achieved with conventional arrangements such as those that rely on an external GPS clock or atomic clock.

In practice, for the chirps at the master radar 302 and slave radar 304, 306 to generate a tone response, it is important to ensure that the frequency difference is within the bandwidth of the IF processing chain of a radar. For radar operating in millimetre wave bands and chirping over wide RF bands, the frequency differences between two unsynchronised radar devices can be several GHz and well outside of the IF bandwidth, which is typically several MHz.

The master and slave chirp loops are each of fixed time duration. A chirp frame contains a sequence of multiple chirp loops. A chirp frame is created wherein the start time of the slave chirps within the loop are successively offset by a particular dither (e.g. few nanoseconds) on each repeat of the loop.

When a slave loop aligns (within the bandwidth of the mixed down signal processing system), with a master loop chirp, at a particular offset (e.g. a dither of some number of nanoseconds), then the FMCW signal from the master radar 302 will be observable in the IF band at the slave radar 304, 306. At this point, the offset time is known that places the slave in band of the master and so both have coarsely (i.e. to within a few nanoseconds) time aligned FMCW chirps. In other words, the slave has 'acquired' the master.

Figure 13:
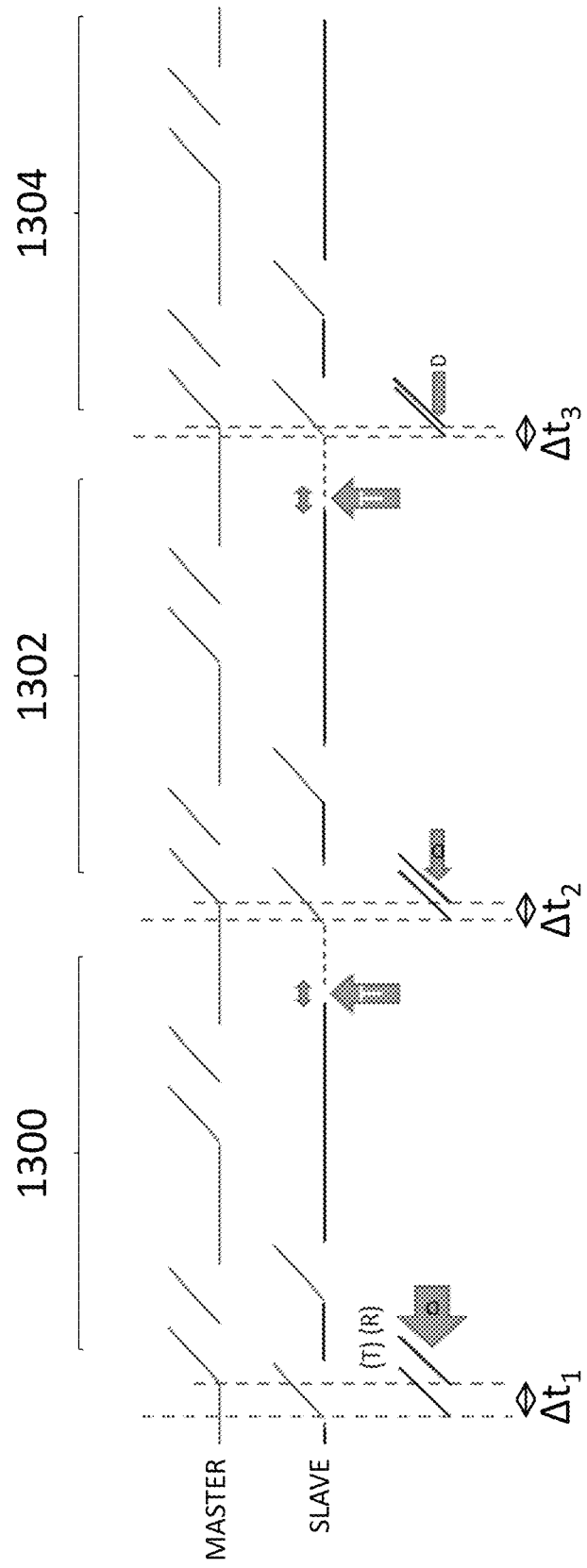
FIG. 13 is a plot illustrating the relative timing shifts as a result of applying adjustments to the slave chirp transmission timing under search and locking phases.

As mentioned previously, before the locking phase can be carried out, it is important to ensure that the frequency difference is within the bandwidth of the IF processing chain, i.e. that there is an in-band tone. To check for this, a search phase is used whenever the tone is not observable in the IF band at the radar. This search phase is shown in FIG. 13. During each successive frame, the time difference applied is denoted 'T', while 'D' is used to denote the frequency difference between the master and secondary chirps.

In order to search for the in-band tone, step changes are applied to the chirp transmission timing of the slave radar 304, 306, thereby shifting the timings of the slave chirps relative to the master chirps. In particular, if no in-band tone is found, the start time is stepped in an interval equal to the IF band time window.

Figure 17:
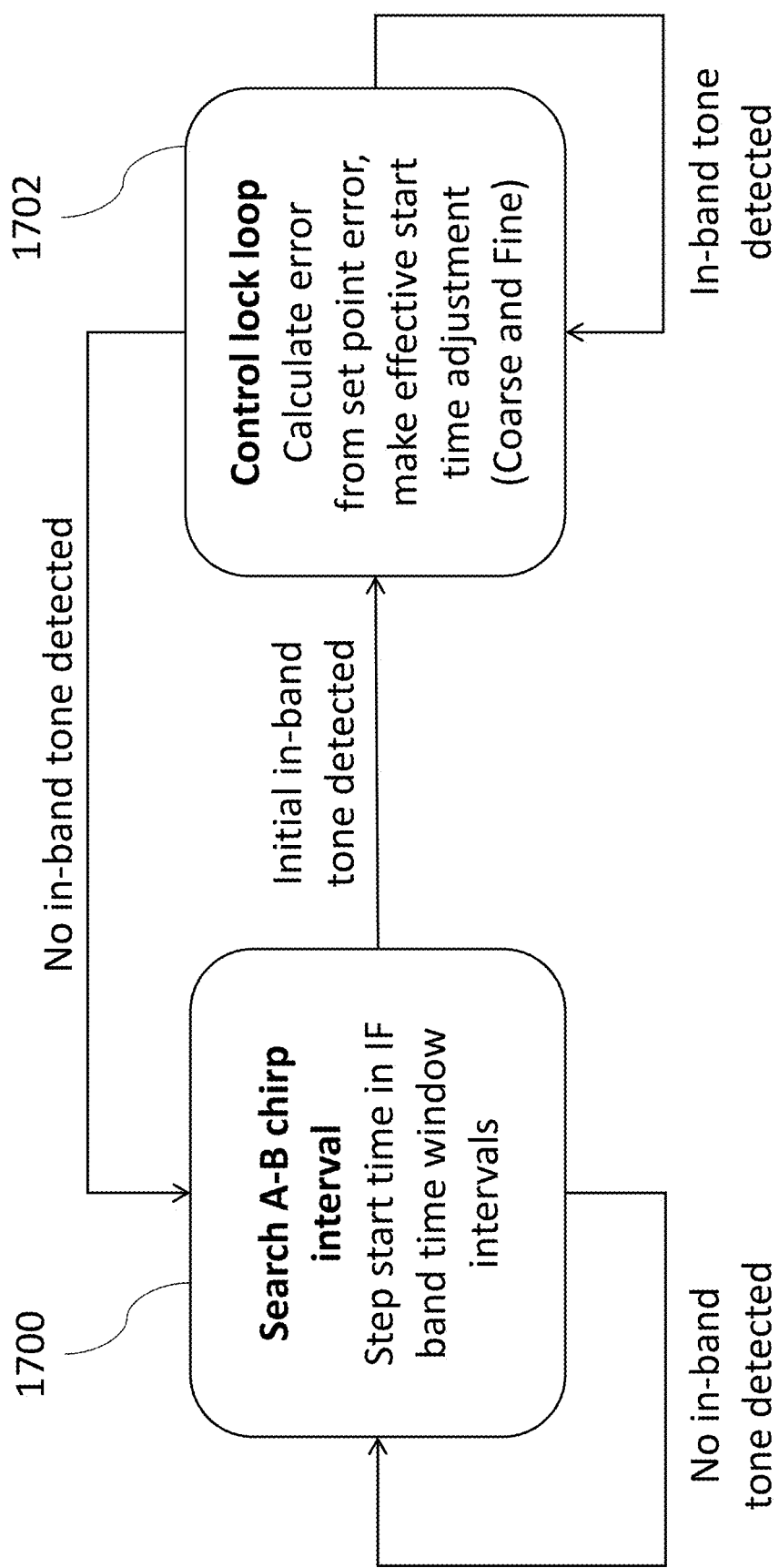
FIG. 17 is a state diagram illustrating the search and lock phases used in accordance with embodiments of the present invention.

The continual operation between the 'search phase' and the 'locking phase' can be understood with reference to the state diagram of FIG. 17. Assuming the system starts in the search phase 1700, the slave radar searches the chirp interval of the master radar to look for the in-band tone. If no in-band tone is detected, the slave radar remains in the search phase 1700 state, and steps its transmission start time by an interval equal to an IF band time window.

Once an in-band tone is detected, the slave radar moves to the locking phase 1702 state, in which it carries out the coarse and fine locking procedures outlined previously to drive the tone to the desired set point.

As can be seen in FIG. 13, in a first period of time 1300, the start times of the chirps at the master and slave are not aligned—i.e. there is a time gap $\Delta t_1$ between them—and as a result the frequency difference does not appear in-band.

A time step is applied, and the search process is repeated in a second period of time 1302. While the time gap $\Delta t_2$ between the master and slave chirps is reduced, and so the frequency difference is reduced, it is still too large to appear in band.

Finally, after a further time step, in a third period of time 1304, the gap in time $\Delta t_3$ between the master and slave chirps is sufficiently reduced that the frequency difference appears in band.

Once an in-band tone is detected (i.e. the tone appears in the difference between the spectral responses), the tone is driven toward a set point frequency (i.e. a particular frequency value or range within the IF band) using the coarse lock process described herein.

Once acquired, the slave chirp loop is adjusted to chirp on the same time offset for each chirp loop in the continually repeating frame sequence. The master will appear in band at the slave on each of the chirp loops, rather than just the one seen periodically across all loops in the frame during the acquisition phase.

The position of the tone resulting from one radar at the other (i.e. its frequency within the IF spectrum) may, in practice, change due to drift between the independent system clocks at each radar 302, 304, 306. By incrementally adjusting the time offset at the slave radar 304, 306, the tone can be controlled to remain at a set point and compensate for this drift during the locking phase. The locking phase may include both coarse and fine adjustments to the timing, in accordance with the processes described.

Once locked, the frequency offset measured in the IF at the master radar 302 is a result of the time-of-flight transmission only between the slave radar 304, 306 and the master radar 302. For a 10 ns coarse lock resolution, the expected error on distance measurement is 3 meters.

The position of the transmitted signal from the master radar 302 within the IF processed at the slave radar 304, 306 allows further 'fine locking' of the chirp start times between the two (or more) radar devices 302, 304, 306.

Time dithering at periods of less than 10 ns is not usually possible with commonly available low-cost system-on-chip (SoC) radar devices. To further control and minimise the chirp start times, the frequency start and end of the slave chirp can be adjusted and controlled, as shown in FIG. 14.

Figure 14:
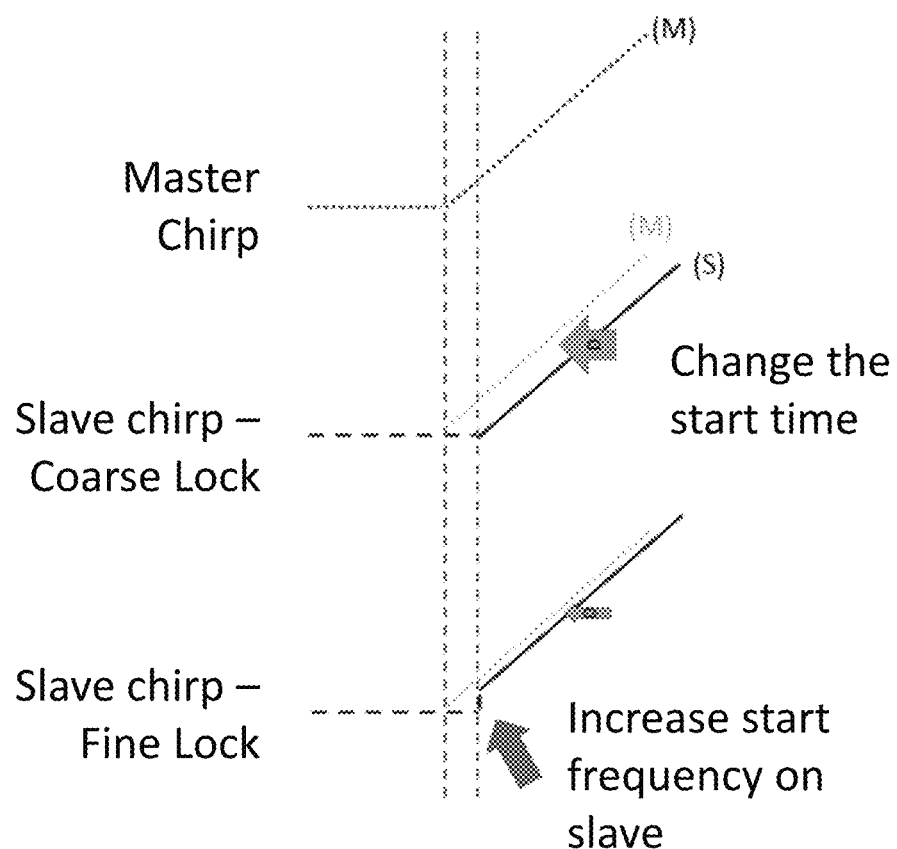
FIG. 14 is a plot illustrating a fine lock process in which the initial frequency of the chirps at the slave radar is varied to improve synchronisation.

As can be seen in FIG. 14, by adjusting the initial frequency of the chirp loop at the slave radar device 304, 306, the slopes for the chirps of the master (M) and slave (S) radars can be brought into closer alignment with one another.

In other words, the coarse lock process shifts the plot of the slave chirp loop in FIG. 14 horizontally (i.e. left to right, or vice versa) by changing the chirp start time, and the fine lock process shifts the plot of the slave chirp loop vertically (i.e. upwards or downwards) by changing the chirp start frequency (which equivalently moves the effective start time of the chirp, at a finer resolution—i.e. the resultant frequency difference is the same as it would have been for a chirp that had started earlier or later in time, as appropriate).

This method can result in sub-nanosecond chirp start synchronisation errors and improve range measurement resolution to within a centimetre. At this point the slave radar 304, 306 is 'fine locked'.

The control of the coarse time offset, and the fine frequency start point can be adjusted using a traditional PID methodology. Those skilled in the art will appreciate that such PID control schemes use a feedback loop to calculate an error between a measured variable (in this case, the frequency of the tone at the slave within the IF band) and some set point, and to apply a correction to an input variable based on proportional, integral, and derivative terms of that error. The Applicant has appreciated that PID control is particularly beneficial in this case because it provides for accurate and responsive control over the synchronisation of the radar devices, compensating for changes such as due to clock drift or environmental changes.

Figure 15:
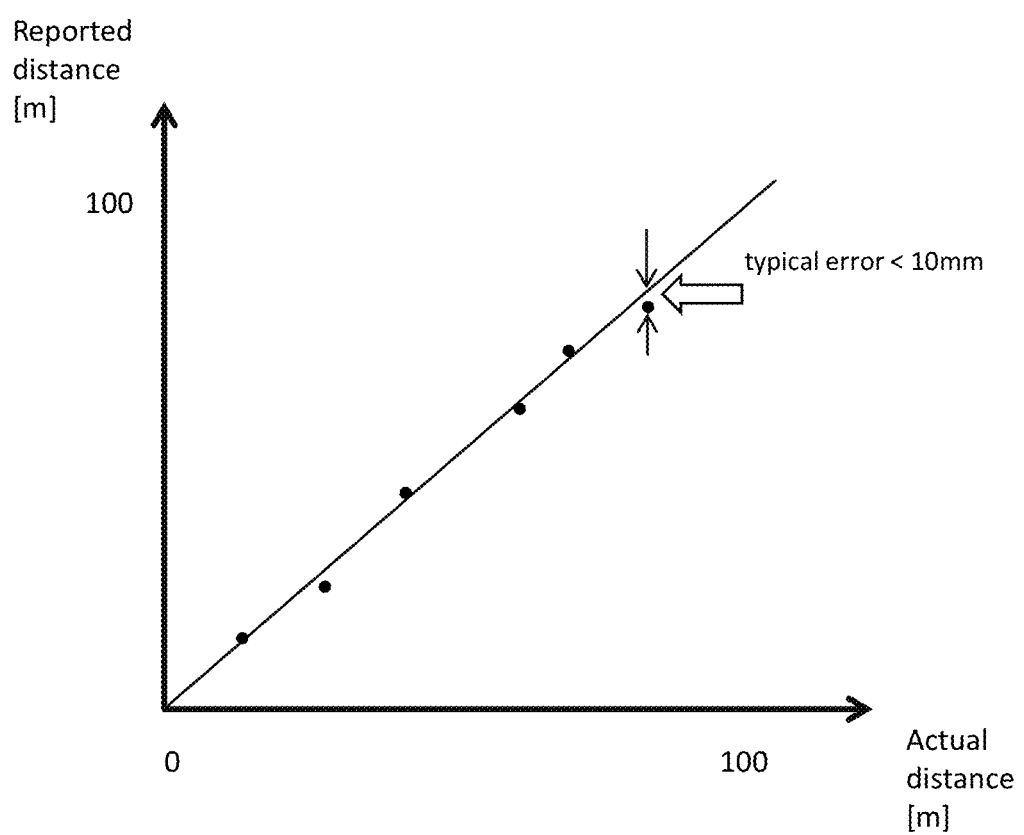
FIG. 15 is a graph illustrating the reported distance versus actual distance performance of a radar system using an embodiment of the present invention.

FIG. 15 is a graph illustrating the reported distance versus actual distance performance of a radar system using an embodiment of the present invention.

In this particular non-limiting example, the multistatic radar system is configured to use an IF bandwidth of 20 MHz, and a frequency step resolution of 100 Hz (for fine lock control), with synchronisation error measurement rate and control loop correction at 1 kHz, an embodiment of the present invention may achieve synchronisation between master and slave radars within tens of picoseconds.

This may be verified through distance measurement accuracy in the order of millimetres, between master and slave radar. Synchronisation within 33 ps translates to 10 mm range measurement accuracy.

Figure 16:
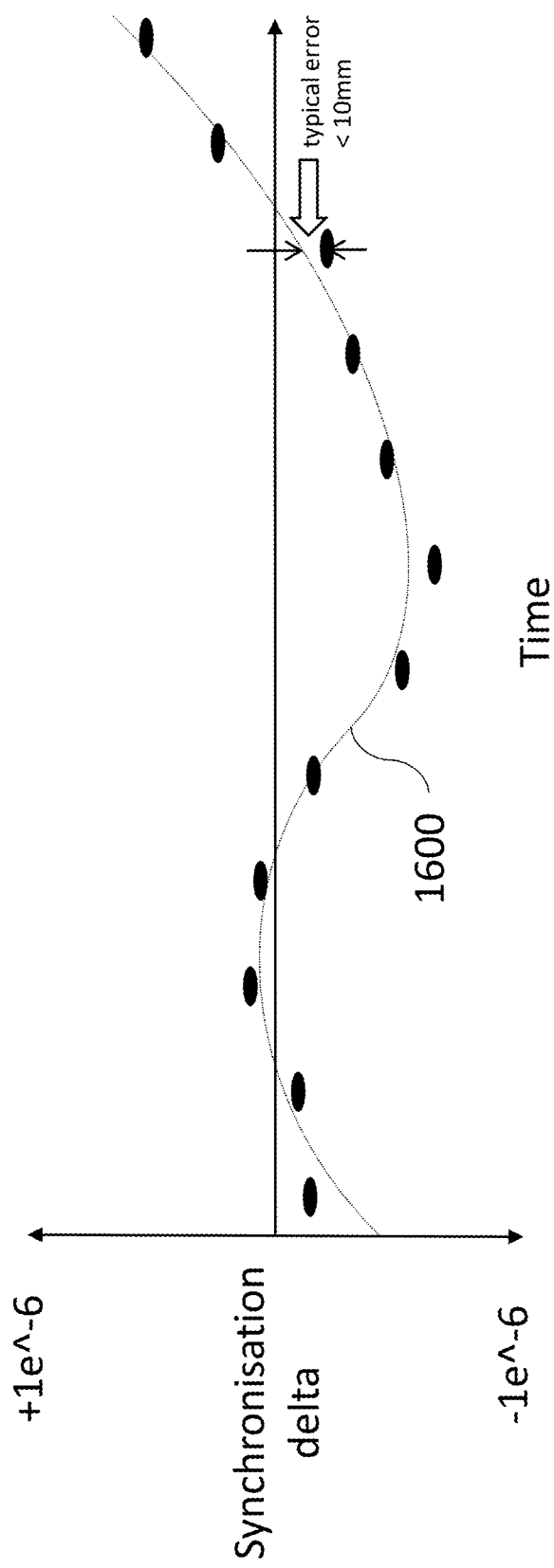
FIG. 16 is a graph illustrating the synchronisation delta performance of a radar system using an embodiment of the present invention.

FIG. 16 is a graph illustrating the synchronisation delta performance of a radar system using an embodiment of the present invention. The x-axis represents time, while the y-axis represents the 'synchronisation delta', i.e. the error in synchronisation between the two radar devices. Typically, there will be some natural drift between the clocks at each radar device, which is represented by the plot line 1600. The markers 1602 on the graph indicate the synchronisation delta of the radar system.

Ideally, these markers 1602 would follow the plot line 1600 identically, however in a practical system this is not possible, e.g. due to systemic errors. However, the gap between these is very small, leading to only very small errors in range measurement, typically of the order of 10 mm.

Further range accuracy improvements are feasible through improvements in the control loop measurement accuracy and optimised control techniques.

It will be appreciated that embodiments of the present invention may provide an FMCW radar device, system, and methods for operating the same that provides for 'self-synchronisation', i.e. in which one radar device may synchronise to another without needing a separate communication channel between the radar devices or dedicated timing hardware (e.g. a GPS or atomic clock). Embodiments of the present invention may provide improvements to performance, in which measurement range error and accuracy can be significantly improved. The present invention may also provide benefits in terms of bandwidth efficiency and hardware requirements. By following the principles outlined herein, a radar system may be implemented in which multiple unconnected, physically separated radars can operate simultaneously through a 'self-synchronisation' process.

While specific embodiments of the present invention have been described in detail, it will be appreciated by those skilled in the art that the embodiments described in detail are not limiting on the scope of the claimed invention.

The invention claimed is:

1. A frequency modulated continuous wave (FMCW) radar system comprising:
    a first FMCW radar device configured to transmit a plurality of first FMCW chirp frames each having a first pattern of time slots, said first pattern comprising: a first time slot of the first pattern, said first time slot of the first pattern containing a first FMCW chirp; a second time slot of the first pattern, said second time slot of the first pattern containing a second FMCW chirp; and a plurality of FMCW chirp-free time slots of the first pattern;
    a second FMCW radar device configured to transmit a plurality of second FMCW chirp frames each having a second pattern of time slots, said second pattern comprising: a first time slot of the second pattern, said first time slot of the second pattern containing a third FMCW chirp; a second time slot of the second pattern, said second time slot of the second pattern containing a fourth FMCW chirp; and a plurality of FMCW chirp-free time slots of the second pattern;

wherein the first and second patterns are selected such that when one of the FMCW chirps in a first FMCW chirp frame coincides in time with one of the FMCW chirps in a second FMCW chirp frame, the other FMCW chirp in said first FMCW chirp frame does not coincide in time with the other FMCW chirp in said second FMCW chirp frame;

said second FMCW radar device being further configured to:
a) mix first signals from a received first FMCW chirp frame and a transmitted second FMCW chirp frame, said first signals corresponding to the time slot of the third FMCW chirp, thereby generating a first spectral response;
b) mix second signals from the received first FMCW chirp frame and the transmitted second FMCW chirp frame, said second signals corresponding to the time slot of the fourth FMCW chirp, thereby generating a second spectral response;
c) determine a difference between the first and second spectral responses and determine whether said difference contains a tone having a signal power greater than a predetermined threshold within an in-band frequency range;
d) when the difference does not contain a tone having a signal power greater than the predetermined threshold within the in-band frequency range, the second FMCW radar device applies a predetermined interval step to the transmission timing of the next second FMCW chirp frame; and
e) when the difference contains a tone having a signal power greater than the predetermined threshold within the in-band frequency range, the second FMCW radar device applies a variable dither to the transmission timing of the next second FMCW chirp frame, thereby driving a frequency of the tone toward a set point within the in-band frequency range.

2. The FMCW radar system of claim 1, wherein the first radar device comprises a master.

3. The FMCW radar system of claim 1, wherein the second radar device comprises a slave.

4. The FMCW radar system of claim 1, comprising a plurality of second radar devices.

5. The FMCW radar system of claim 4, wherein the second pattern comprises alternating between FMCW chirps and chirp-free time slots.

6. The FMCW radar system of claim 1, wherein the second radar device comprises a controller configured to carry out steps a) to e) using a feedback loop to monitor for the tone and to adjust the variable dither in response.

7. The FMCW radar system of claim 6, wherein the controller comprises a proportional-integral-derivative (PID) controller.

8. The FMCW radar system of claim 1, wherein the second radar device is further configured to:
f) when the difference contains a tone having a signal power greater than the predetermined threshold within the in-band frequency range, the second FMCW radar device adjusts a start frequency or effective start time of the second chirps transmitted by the second radar device to reduce a frequency difference between a chirp in a next first FMCW chirp frame and a chirp in a next second FMCW chirp frame.

9. The FMCW radar system of claim 8, wherein the second radar device comprises a controller configured to carry out step f) using a feedback loop to monitor for the tone and to adjust the start frequency or effective start time in response.

10. The FMCW radar system of claim 1, wherein the first chirp frames are transmitted periodically by the first radar device.

11. A frequency modulated continuous wave (FMCW) radar device configured to:
receive from an external radar device a plurality of first FMCW chirp frames each having a first pattern of time slots, said first pattern comprising: a first time slot of the first pattern, said first time slot of the first pattern containing a first FMCW chirp; a second time slot of the first pattern, said second time slot of the first pattern containing a second FMCW chirp; and a plurality of FMCW chirp-free time slots of the first pattern; and
transmit a plurality of second FMCW chirp frames each having a second pattern of time slots, said second pattern comprising: a first time slot of the second pattern, said first time slot of the second pattern containing a third FMCW chirp; a second time slot of the second pattern, said second time slot of the second pattern containing a fourth FMCW chirp; and a plurality of FMCW chirp-free time slots of the second pattern;
wherein the second pattern is selected such that when one of the FMCW chirps in a first FMCW chirp frame coincides in time with one of the FMCW chirps in a second FMCW chirp frame, the other FMCW chirp in said first FMCW chirp frame does not coincide in time with the other FMCW chirp in said second FMCW chirp frame;
said FMCW radar device being further configured to:
a) mix first signals from a received first FMCW chirp frame and a transmitted second FMCW chirp frame, said first signals corresponding to the time slot of the third FMCW chirp, thereby generating a first spectral response;
b) mix second signals from the received first FMCW chirp frame and the transmitted second FMCW chirp frame, said second signals corresponding to the time slot of the fourth FMCW chirp, thereby generating a second spectral response;
c) determine a difference between the first and second spectral responses and determine whether said difference contains a tone having a signal power greater than a predetermined threshold within an in-band frequency range;
d) when the difference does not contain a tone having a signal power greater than the predetermined threshold within the in-band frequency range, apply a predetermined interval step to the transmission timing of the next second FMCW chirp frame; and
e) when the difference contains a tone having a signal power greater than the predetermined threshold within the in-band frequency range, apply a variable dither to the transmission timing of the next second FMCW chirp frame, thereby driving a frequency of the tone toward a set point within the in-band frequency range.

12. The FMCW radar device of claim 11, comprising a slave.

13. The FMCW radar device of claim 11, wherein the second pattern comprises alternating between FMCW chirps and chirp-free time slots.

14. The FMCW radar device of claim 11, comprising a controller configured to carry out steps a) to e) using a feedback loop to monitor for the tone and to adjust the variable dither in response.

15. The FMCW radar device of claim 11, further configured to:

f) when the difference contains a tone having a signal power greater than the predetermined threshold within the in-band frequency range, adjust a start frequency of (or effective start time of) the second chirps transmitted by the radar device to reduce a frequency difference between a chirp in a next first FMCW chirp frame and a chirp in a next second FMCW chirp frame.

16. A method of operating a frequency modulated continuous wave (FMCW) radar device, said method comprising:

receiving from an external radar device a plurality of first FMCW chirp frames each having a first pattern of time slots, said first pattern comprising: a first time slot of the first pattern, said first time slot of the first pattern containing a first FMCW chirp; a second time slot of the first pattern, said second time slot of the first pattern containing a second FMCW chirp; and a plurality of FMCW chirp-free time slots of the first pattern; and transmitting a plurality of second FMCW chirp frames each having a second pattern of time slots, said second pattern comprising: a first time slot of the second pattern, said first time slot of the second pattern containing a third FMCW chirp; a second time slot of the second pattern, said second time slot of the second pattern containing a fourth FMCW chirp; and a plurality of FMCW chirp-free time slots of the second pattern;

wherein the second pattern is selected such that when one of the FMCW chirps in a first FMCW chirp frame coincides in time with one of the FMCW chirps in a second FMCW chirp frame, the other FMCW chirp in said first FMCW chirp frame does not coincide in time with the other FMCW chirp in said second FMCW chirp frame;

said method further comprising:

a) mixing first signals from a received first FMCW chirp frame and a transmitted second FMCW chirp frame, said first signals corresponding to the time slot of the third FMCW chirp, thereby generating a first spectral response;

b) mixing second signals from the received first FMCW chirp frame and the transmitted second FMCW chirp frame, said second signals corresponding to the time slot of the fourth FMCW chirp, thereby generating a second spectral response;

c) determining a difference between the first and second spectral responses and determining whether said difference contains a tone having a signal power greater than a predetermined threshold within an in-band frequency range; and d) when the difference does not contain a tone having a signal power greater than the predetermined threshold within the in-band frequency range, applying a predetermined interval step to the transmission timing of the next second FMCW chirp frame; and e) when the difference contains a tone having a signal power greater than the predetermined threshold within the in-band frequency range, applying a variable dither to the transmission timing of the next second FMCW chirp frame, thereby driving a frequency of the tone toward a set point within the inband frequency range.

17. The method as claimed in claim 16, further comprising:

f) when the difference contains a tone having a signal power greater than the predetermined threshold within the in-band frequency range, adjusting a start frequency or effective start time of the second chirps transmitted by the radar device to reduce a frequency difference between a chirp in a next first FMCW chirp frame and a chirp in a next second FMCW chirp frame.

18. A non-transitory computer-readable medium comprising instructions that, when executed by a processor, cause the processor to carry out the method of claim 16.

19. The FMCW radar system of claim 9, wherein the controller comprises a proportional-integral-derivative (PID) controller.

20. The FMCW device of claim 11, wherein the FMCW radar device further comprises a controller configured to carry out step f) using a feedback loop to monitor for the tone and to adjust the start frequency or effective start time in response.

\* \* \* \* \*